(12) United States Patent
Sheng et al.

(10) Patent No.: US 10,911,117 B2
(45) Date of Patent: Feb. 2, 2021

(54) ELECTRONIC DEVICE IN WIRELESS COMMUNICATION SYSTEM, METHOD, AND COMPUTER READABLE STORAGE MEDIUM

(71) Applicant: Sony Corporation, Tokyo (JP)

(72) Inventors: Bin Sheng, Nanjing (CN); Pingping Xu, Nanjing (CN); Penshun Lu, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/638,753

(22) PCT Filed: Nov. 22, 2018

(86) PCT No.: PCT/CN2018/116903
§ 371 (c)(1),
(2) Date: Feb. 13, 2020

(87) PCT Pub. No.: WO2019/105272
PCT Pub. Date: Jun. 6, 2019

(65) Prior Publication Data
US 2020/0336184 A1 Oct. 22, 2020

(30) Foreign Application Priority Data
Nov. 29, 2017 (CN) .......................... 2017 1 1227563

(51) Int. Cl.
*H04B 7/06* (2006.01)
*H04B 7/08* (2006.01)

(52) U.S. Cl.
CPC ......... *H04B 7/0617* (2013.01); *H04B 7/0623* (2013.01); *H04B 7/0626* (2013.01); *H04B 7/0628* (2013.01); *H04B 7/086* (2013.01)

(58) Field of Classification Search
CPC .. H04B 7/0408; H04B 7/0613; H04B 7/0615; H04B 7/0617; H04B 7/0626;
(Continued)

(56) References Cited

U.S. PATENT DOCUMENTS 10,405,366 B1 * 9/2019 Liu .................... H04L 61/6022
2017/0238271 A1 * 8/2017 Viorel .................. H04W 16/28
370/350

FOREIGN PATENT DOCUMENTS

CN          103298098 A     9/2013
CN          105493547 A     4/2016
(Continued)

OTHER PUBLICATIONS

International Search Report and Written Opinion dated Jan. 30, 2019 for PCT/CN2018/116903 filed on Nov. 22, 2018, 8 pages including English Translation of the International Search Report.

*Primary Examiner* — Siu M Lee
(74) *Attorney, Agent, or Firm* — Xsensus LLP

(57) ABSTRACT

Disclosed are an electronic device in a wireless communication system, a method, and a computer readable storage medium. The electronic device in the wireless communication system disclosed in the present invention comprises a processing circuit, being configured to: determine an area for beamforming during a specific time period; transmit information associated with the area to one or more auxiliary transmitting devices in the wireless communication system, so that the one or more auxiliary transmitting devices generate beam signals during the specific time period and transmit the beam signals to the area; and generate the beam signals simultaneously with the one or more auxiliary transmitting devices during the specific time period and transmitting the beam signals to the area. By using the electronic device, the method, and the computer readable storage
(Continued)

medium disclosed in the present invention, a plurality of transmitting devices can simultaneously transmit beam signals to a same area.

20 Claims, 20 Drawing Sheets

(58) Field of Classification Search
CPC .. H04B 7/0623; H04B 7/0628; H04B 7/0684;
H04B 7/0695; H04B 7/086
See application file for complete search history.

(56) References Cited

FOREIGN PATENT DOCUMENTS

| | | |
|---|---|---|
| CN | 107219518 A | 9/2017 |
| WO | 2011/054768 A1 | 5/2011 |

* cited by examiner

ELECTRONIC DEVICE IN WIRELESS COMMUNICATION SYSTEM, METHOD, AND COMPUTER READABLE STORAGE MEDIUM

CROSS-REFERENCE TO RELATED APPLICATIONS

The present application is based on PCT filing PCT/CN2018/116903, filed Nov. 22, 2018, which claims priority to Chinese Patent Application No. 201711227563.4, filed with the Chinese Patent Office on Nov. 29, 2017, each of which is incorporated herein by reference in its entirety.

FIELD

An embodiment of the present invention generally relates to the field of wireless communication, and in particular, to an electronic equipment served as a main transmitting apparatus and an electronic equipment served as an auxiliary transmitting apparatus in a wireless communication system, a wireless communication method executed by the electronic equipment served as the main transmitting apparatus in the wireless communication system and a wireless communication method executed by the electronic equipment served as the auxiliary transmitting apparatus in the wireless communication system and a computer-readable storage medium.

BACKGROUND

Beamforming is a signal preprocessing technology based on an antenna array. Beamforming produces a directional beam by adjusting weighting coefficient of each element in the antenna array, such that a significant array gain can be obtained. Therefore, beamforming technology has great advantages in terms of expanding coverage, improving edge throughput, and suppressing interference and the like. In the future communication system, beamforming is an important technology that can increase spectrum utilization and power utilization.

In a wireless communication system using beamforming, there are scenarios in which multiple transmitting apparatuses simultaneously transmit a beam signal to a receiving apparatus. That is, different transmitting apparatuses may simultaneously transmit the beam signal to a region where the receiving apparatus is located, that is, the synchronization between beams. In the wireless communication system, a conventional synchronization only relates to the synchronization between different transmitting apparatuses in time and frequency, and does not relate to the synchronization in beam.

Therefore, it is necessary to provide a solution to implement that different transmitting apparatuses simultaneously transmit beam signals to a region where a receiving apparatus is located.

SUMMARY

This summary part provides a general summary of the present disclosure, rather than discloses a full scope or all features of the present disclosure.

An object of the present disclosure is to provide an electronic equipment in a wireless communication system, a wireless communication method performed by the electronic equipment in the wireless communication system, and a computer-readable storage medium, to implement that different transmitting apparatuses simultaneously transmit a beam signal to a region where a receiving apparatus is located.

According to an aspect of the present disclosure, an electronic equipment served as a main transmitting apparatus in a wireless communication system is provided. The electronic equipment includes a processing circuit configured to: determine a region for beamforming within a specific time period; transmit information associated with the region to one or more auxiliary transmitting apparatuses in the wireless communication system for generating a beam signal and transmitting the beam signal to the region by the one or more auxiliary transmitting apparatuses within the specific time period; and generate a beam signal and transmit the beam signal to the region simultaneously with the one or more auxiliary transmitting apparatuses within the specific time period.

According to another aspect of the present disclosure, an electronic equipment used as an auxiliary transmitting apparatus in a wireless communication system is provided. The electronic equipment includes a processing circuit configured to: receive, from a main transmitting apparatus in the wireless communication system, information associated with a region for beamforming within a specific time period; and generate a beam signal and transmit the beam signal to the region within the specific time period. The main transmitting apparatus and the auxiliary transmitting apparatus generate a beam signal and transmit the beam signal to the region simultaneously within the specific time period.

According to another aspect of the present disclosure, a wireless communication method executed by an electronic equipment served as a main transmitting apparatus in a wireless communication system is provided. The method includes: determining a region for beamforming within a specific time period; transmitting information associated with the region to one or more auxiliary transmitting apparatuses in the wireless communication system for generating a beam signal and transmitting the beam signal to the region by the one or more auxiliary transmitting apparatuses within the specific time period; and generating a beam signal and transmitting the beam signal to the region simultaneously with the one or more auxiliary transmitting apparatuses within the specific time period.

According to another aspect of the present disclosure, a wireless communication method executed by an electronic equipment served as an auxiliary transmitting apparatus in a wireless communication system is provided. The method includes: receiving, from a main transmitting apparatus in the wireless communication system, information associated with a region for beamforming within a specific time period; and generating a beam signal and transmitting the beam signal to the region within the specific time period. The main transmitting apparatus and the electronic equipment generate a beam signal and transmit the beam signal to the region simultaneously within the specific time period.

According to another aspect of the present disclosure, a computer-readable storage medium including computer-executable instructions is provided. The computer-executable instructions, when executed by a computer, cause the computer to execute the wireless communication method according to the present disclosure.

With an electronic equipment in a wireless communication system according to the present disclosure, a wireless communication method executed by the electronic equipment in the wireless communication system, and a computer-readable storage medium, an main transmitting apparatus may determine a region for beamforming and transmit information associated with the region to an auxiliary transmitting apparatus, such that the main transmitting apparatus and the auxiliary transmitting apparatus transmit the beam signal to the region simultaneously to implement the synchronization between beams.

Further applicability regions will become apparent according to the description provided herein. The description and specific example in the summary is only illustrative purpose and is not intended to limit the scope of the present disclosure.

BRIEF DESCRIPTION OF THE DRAWINGS

The drawings described herein are only used for illustrating the selected embodiments rather than all possible embodiments, and are not intended to limit the scope of the present disclosure. In the drawing.

Figure 1:
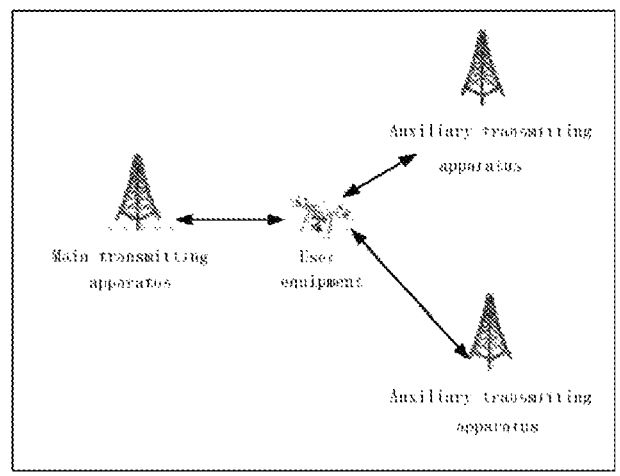
FIG. 1 is a schematic diagram illustrating a scenario according to an embodiment of the present disclosure.

Although various modification and alternations are easily made onto the present disclosure, the specific embodiments are illustrated in the drawings as an example, and are described in detail herein. However, it should be understood that description for the specific embodiments is not intended to limit the present disclosure into a disclosed specific form, and the present disclosure aims to cover all modification, equivalents and alternations within the spirit and scope of the present disclosure. It is noted that throughout the several figures, corresponding reference numerals indicate corresponding components.

DETAILED DESCRIPTION OF EMBODIMENTS

Examples of the present disclosure are described more fully with reference to the drawings. The following description is exemplary substantially rather than being intended to limit the present disclosure and applications or purposes of the present disclosure.

The exemplary embodiments are provided such that the present disclosure will become thorough, and will convey the scope of the present disclosure fully to those skilled in the art. Examples of numerous specific details, such as specific components, devices, and methods, are set forth to provide a thorough understanding of the embodiments of the present disclosure. It will be apparent to those skilled in the art that exemplary embodiments may be implemented in many different forms without the use of specific details, and should not be construed as limiting the scope of the present disclosure. In some exemplary embodiments, well-known processes, well-known structures, and well-known technologies are not described in detail.

The present disclosure is described below in the following order:

1. Description of scenarios;
2. Configuration example of a main transmitting apparatus;

a) Basic configuration;
b) Configuration for locating a user equipment;
c) Configuration for handover for a user equipment;
d) Configuration for CoMP;
3. Configuration example of an auxiliary transmitting apparatus;
4. Configuration example of a user equipment;
5. Method embodiments;
5.1 Flowchart of a method executed by a main transmitting apparatus;
5.2 Flowchart of a method for locating a user equipment;
5.3 Flowchart of a method for performing handover of a user equipment;
5.4 Flowchart of a method for performing CoMP transmission;
5.5 Flowchart of a method executed by an auxiliary transmitting apparatus;
6. Application example.

1. Description of Scenarios

FIG. 1 is a schematic diagram illustrating a scenario according to an embodiment of the present disclosure. As illustrated in FIG. 1, a wireless communication system includes a main transmitting apparatus, two auxiliary transmitting apparatuses, and a user equipment. Both the main transmitting apparatus and the auxiliary transmitting apparatuses may provide services for the user equipment, and both the main transmitting apparatus and the auxiliary transmitting apparatuses may use beamforming technology, that is, forming a beam with a direction and transmit a signal via the beam, which is also referred to as beamforming hereinafter. In some cases, the main transmitting apparatus and the two auxiliary transmitting apparatuses may transmit information to the user equipment simultaneously. Here, position of the user equipment may be known or unknown for the transmitting apparatus.

It should be noted that, FIG. 1 only illustrates a scenario in which the wireless communication system includes a main transmitting apparatus and two auxiliary transmitting apparatuses. The wireless communication system may further include one or more than two auxiliary transmitting apparatuses. That is, the wireless communication system includes a main transmitting apparatus and one or more auxiliary transmitting apparatuses, that is, the wireless communication system includes multiple transmitting apparatuses. Further, the wireless communication system may further include multiple user equipments. In addition, FIG. 1 only illustrates a case that the user equipment is a drone, and the user equipment may also be other types of user equipments. That is, the present disclosure is applied to the following scenario: multiple transmitting apparatuses are desirable to simultaneously perform beam scanning to a region where the user equipment is located. Furthermore, embodiments of the present disclosure may be preferably applied to a high frequency band scenario, for example, a New Radio (NR) system.

For the above scenarios, an electronic equipment in a wireless communication system, a wireless communication method executed by an electronic equipment in a wireless communication system, and a computer-readable storage medium according to the present disclosure are provided, to implement that different transmitting apparatuses simultaneously transmit a beam signal to a region where a receiving apparatus is located.

A main transmitting apparatus and an auxiliary transmitting apparatus (which are collectively referred to as transmitting apparatus) according to the present disclosure may be any type of Transmit and Receive Port (TRP). The TRP may have a function of transmitting and receiving, for example, the TRP may receive information from the user equipment and the base station equipment, and may transmit information to the user equipment and the base station equipment. In an example, the TRP may provide services for the user equipment and is controlled by the base station equipment. That is, the base station equipment provides services to the user equipment via the TRP. In another example, the transmitting apparatus may be any type of base station equipment.

The user equipment according to the present disclosure may be a mobile terminal (such as a smartphone, a tablet personal computer (PC), a notebook PC, a portable game terminal, a portable/softdog mobile router, and a digital camera device) or an in-vehicle terminal (such as a vehicle navigation apparatus). Specifically, the user equipment may also be a terminal device capable of flight function, for example, a drone. The user equipment may also be implemented as a terminal executing Machine to Machine (M2M) communication (which is also referred to as a Machine-Type Communication (MTC) terminal). In addition, the user equipment may be a wireless communication module (such as an integrated circuit module including a single wafer) installed on each of the terminals described above.

2. Configuration Example of a Main Transmitting Apparatus

<2.1 Basic Configuration>

Figure 2:
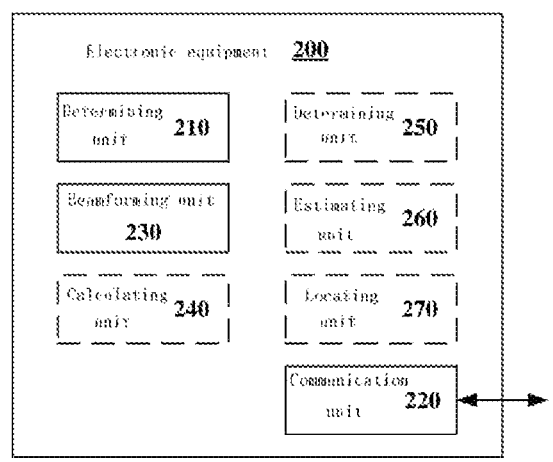
FIG. 2 is a block diagram illustrating a structure of an electronic equipment served as a main transmitting apparatus according to an embodiment of the present disclosure.

FIG. 2 is a block diagram illustrating a structure of an electronic equipment 200 served as a main transmitting apparatus in a wireless communication system according to an embodiment of the present disclosure. The wireless communication system may include a main transmitting apparatus and one or more auxiliary transmitting apparatuses. Further, the wireless communication system may further include one or more user equipments, and each user equipment is provided services by one or more transmitting apparatuses. As illustrated in FIG. 2, the electronic equipment 200 may include a determining unit 210, a communication unit 220, and a beamforming unit 230.

Here, various units of the electronic equipment 200 may be included in a processing circuit. It should be noted that, the electronic equipment 200 may include not only a processing circuit, but also one or more processing circuits. Further, the processing circuit may include various discrete functional units for performing various different functions and/or operations. It should be noted that, these functional units may be physical entities or logical entities, and units with different names may be implemented by the same physical entity.

According to an embodiment of the present disclosure, the determining unit 210 may determine a region for beamforming within a specific time period. Here, the specific time period may represent a time period which is previously agreed between the main transmitting apparatus and the auxiliary transmitting apparatus.

According to an embodiment of the present disclosure, the communication unit 220 may transmit information associated with the region determined by the determining unit 210 to one or more auxiliary transmitting apparatuses in the wireless communication system for generating a beam signal and transmitting the beam signal to the region by the one or more auxiliary transmitting apparatuses within the specific time period. Here, the information associated with the region transmitted by the communication unit 220 to each of one or more auxiliary transmitting apparatuses may be the same or different. After receiving the information associated with the region, the auxiliary transmitting apparatus may generate a beam signal and transmit the beam signal to the region within the specific time period which is previously agreed between the auxiliary transmitting apparatus and the main transmitting apparatus.

According to an embodiment of the present disclosure, the beamforming unit 230 may generate a beam signal and transmit the beam signal to the region simultaneously with one or more auxiliary transmitting apparatuses within the specific time period. That is, within the specific time period, the main transmitting apparatuses and one or more auxiliary transmitting apparatuses both transmit the beam signal to the same scanning region.

It can be seen that, the electronic equipment 200 according to an embodiment of the present disclosure may determine the region for beamforming within the specific time period, and may transmit information associated with the region to the auxiliary transmitting apparatus. therefore, the main transmitting apparatus and the auxiliary transmitting apparatus may transmit the beam signal to the scanning region simultaneously. In this way, different transmitting apparatuses may transmit a beam signal to a scanning region simultaneously to implement the synchronization between beams.

Figure 3:
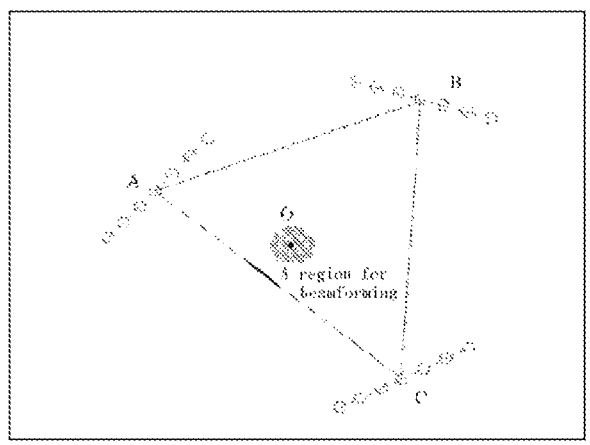
FIG. 3 is a schematic diagram illustrating a scanning region according to an embodiment of the present disclosure.

FIG. 3 is a schematic diagram illustrating a scanning region according to an embodiment of the present disclosure. As illustrated in FIGS. 3, A, B, and C represent three transmitting apparatuses, one of which serves as a main transmitting apparatus and the other two serve as auxiliary transmitting apparatuses. Since each of A, B, and C may use beamforming, that is, forming a beam by using an antenna array, each of A, B, and C may include the antenna array. In FIG. 3, each transmitting apparatus is represented by a top view of the antenna array. As illustrated in FIG. 3, a gray region indicates a region determined by the main transmitting apparatus for beamforming, and a letter O indicates the center of the region. The region is located inside a triangle formed by lines connecting each two adjacent transmitting apparatuses of A, B, and C.

It should be noted that, although FIG. 3 illustrates a case in which the region for beamforming is circular, the region may also be a two-dimensional plane region with other shapes. In addition, the region may be a three-dimensional space region. For example, in a case that the wireless communication system includes a user equipment having high information (for example, a drone), the region may be a three-dimensional space region. In addition, the size of the region is determined by the main transmitting apparatus based on parameters such as beam width, position of the region, and sensitivity of the transmitting apparatus, and the like.

Figure 4:
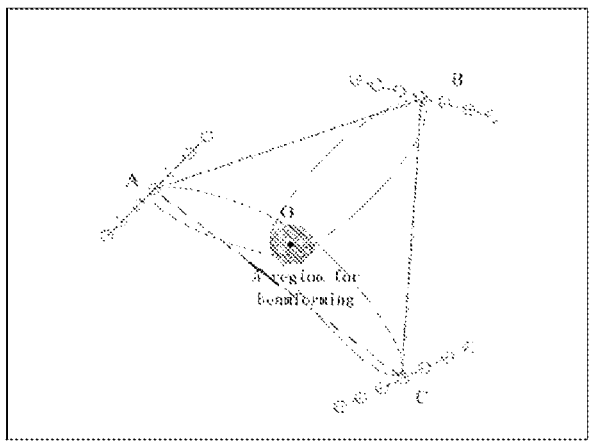
FIG. 4 is a schematic diagram illustrating that a main transmitting apparatus and an auxiliary transmitting apparatus simultaneously scan a scanning region according to an embodiment of the present disclosure.

FIG. 4 is a schematic diagram illustrating that a main transmitting apparatus and an auxiliary transmitting apparatus simultaneously transmit a beam signal to a region for beamforming according to an embodiment of the present disclosure. As illustrated in FIG. 4, each of transmitting apparatuses A, B, and C generates the beam signal and transmits the beam signal to the region for beamforming simultaneously.

According to an embodiment of the present disclosure, at the beginning of a specific time period, both the main transmitting apparatus and the auxiliary transmitting apparatus transmit a beam signal to the same scanning region. Further, within the specific time period, there is one or more Orthogonal Frequency Division Multiplexing (OFDM) symbols. In each OFDM symbol within the specific time period, both the main transmitting apparatus and the auxiliary transmitting apparatus transmit the beam signal to the same scanning region. Therefore, in an embodiment of the present disclosure, the specific time period may represent a time period at which the scanning parameter remains unchanged. That is, within the specific time period, the parameters about beamforming for the main transmitting apparatus and the auxiliary transmitting apparatus remain unchanged, thereby ensuring that the main transmitting apparatus and the auxiliary transmitting apparatus transmit the beam signal to the same scanning region within the whole specific time period. Therefore, in an embodiment of the present disclosure, the main transmitting apparatus and the auxiliary transmitting apparatus may perform beamforming synchronously, that is, "simultaneously" transmitting the beam signal to a scanning region.

According to an embodiment of the present disclosure, the main transmitting apparatus and the auxiliary transmitting apparatus may perform beamforming periodically. That is, in a beamforming period, the parameters used by the main transmitting apparatus and the auxiliary transmitting apparatus in performing beamforming remain unchanged, and in different beamforming periods, the parameters used by the main transmitting apparatus and the auxiliary transmitting apparatus in performing beamforming are different. According to an embodiment of the present disclosure, the specific time period may be next beamforming period. It is assumed here that the beamforming periods of the main transmitting apparatus and the auxiliary transmitting apparatus are the same and synchronized. Therefore, after the main transmitting apparatus transmits the information associated with the region to the auxiliary transmitting apparatus, the auxiliary transmitting apparatus may transmit the beam signal to the region at the next beamforming period of the current time, and the main transmitting apparatus may also transmit the beam signal to the region at the next beamforming period of the current time to transmit the beam signal to the region simultaneously.

According to an embodiment of the present disclosure, the beamforming period of the main transmitting apparatus and the auxiliary transmitting apparatus may be a time slot level, that is, the beamforming period includes one or more time slots; or may be a symbol level, that is, the beamforming period includes one or more OFDM symbols.

According to an embodiment of the present disclosure, the beam signal transmitted by the main transmitting apparatus/auxiliary transmitting apparatus may include data information or control information for example, reference signal. That is, the main transmitting apparatus/auxiliary transmitting apparatus forms a beam that points to the region and transmits the beam signal to the region by power control.

As illustrated in FIG. 2, the electronic equipment 200 may further include a calculating unit 240 configured to calculate information associated with the region. According to an embodiment of the present disclosure, the information associated with the region may include information associated with position of the region. That is, the auxiliary transmitting apparatus may directly obtain the position of the region by using the information, or may transmit the beam signal to the position where the region is located by using the information.

According to an embodiment of the present disclosure, the information associated with the region includes positional information of the region, which is used for determining direction information and power information of the beam by one or more auxiliary transmitting apparatuses. Here, the information associated with the region may include positional information of the region, such that each auxiliary transmitting apparatus determines, based on the position information of the region, direction information and power information of the beam for each auxiliary transmitting apparatus. In this case, the information associated with the region transmitted by the main transmitting apparatus to each auxiliary transmitting apparatus is the same, and then, each auxiliary transmitting apparatus determines direction information and power information of the beam based on the information.

According to an embodiment of the present disclosure, the information associated with the region includes direction information and power information of the beam for each of the one or more auxiliary transmitting apparatuses. In this case, the information associated with the region transmitted by the main transmitting apparatus to each auxiliary transmitting apparatus is different. That is, the main transmitting apparatus may transmit direction information and power information of the beam for the auxiliary transmitting apparatus to each auxiliary transmitting apparatus.

According to an embodiment of the present disclosure, the direction of the beam may be determined based on the direction information of the beam, and a distance transmitted in the above direction may be determined based on the power information of the beam. That is, both the direction information and the farthest region that the beam may reach may be determined based on both direction information and power information of the beam.

According to an embodiment of the present disclosure, the calculating unit 240 may calculate not only direction information and power information of the beam for each auxiliary transmission apparatus, but also direction information and power information of the beam for the electronic equipment 200. The calculating process performed by the calculating unit 240 is described in detail below.

According to an embodiment of the present disclosure, the calculating unit 240 may determine power information of the beam for each auxiliary transmission apparatus according to positional information of each auxiliary transmission apparatus and the positional information of the region. Further, the calculating unit 240 may determine power information of the beam for the electronic equipment 200 according to the positional information of the electronic equipment 200 and the positional information of the region.

According to an embodiment of the present disclosure, the calculating unit 240 may determine power information of the beam for the transmitting apparatus based on a distance between the transmitting apparatus and the region. That is, the calculating unit 240 may determine power information of the beam for the auxiliary transmission apparatus based on the distance between the auxiliary transmission apparatus and the region, and determine power information of the beam for the electronic equipment 200 based on the distance between the electronic equipment 200 and the region. Here, in a cased of calculating the distance between the transmitting apparatus and the region, the center of the region may be used to represent the region to calculate the distance between the transmitting apparatus and the center of the region. According to an embodiment of the present disclosure, after acquiring the distance between the transmitting apparatus and the region, the calculating unit 240 may determine power information of the beam for the transmitting apparatus according to any method known in the art (for example, a link budget method), which is not limited in the present disclosure.

Figure 5:
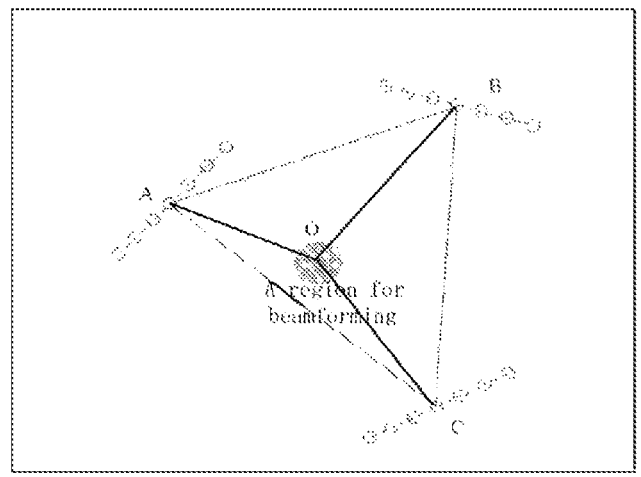
FIG. 5 is a schematic diagram for determining power information of beam scanning according to an embodiment of the present disclosure.

FIG. 5 is a diagram for determining power information of a beam according to an embodiment of the present disclosure. As illustrated in FIG. 5, it is assumed that A is an electronic equipment 200 serving as a main transmitting apparatus, and B and C are auxiliary transmitting apparatuses, A may determine power information of the beam for the electronic equipment 200 based on a distance OA between point O and point A, determine power information of the beam for the auxiliary transmitting apparatus B based on a distance OB between point O and point B, and determine power information of the beam for the auxiliary transmitting apparatus C based on a distance OC between point O and point C.

According to an embodiment of the present disclosure, the calculating unit 240 may determine a distance between the auxiliary transmission apparatus and a region based on the distance between the electronic equipment 200 and the region and positional information of the auxiliary transmission apparatus. Here, since the region is determined by the electronic equipment 200, the electronic equipment 200 may calculate the distance between the electronic equipment 200 and the region. Further, the calculating unit 240 also needs to acquire position of each auxiliary transmitting apparatus, and then may calculate a distance between the electronic equipment 200 and each auxiliary transmitting apparatus, and an angle between a line connecting the electronic equipment 200 and the auxiliary transmitting apparatus and a line connecting electronic equipment 200 and the region. According to an embodiment of the present disclosure, the calculating unit 240 of the electronic equipment 200 may acquire the position of each auxiliary transmitting apparatus by using various methods, for example, by means of reporting by the auxiliary transmitting apparatus, or by means of notifying by a base station equipment, which is not limited in the present disclosure. Still referring to FIG. 5 as an example, after acquiring the OA, the calculating unit 240 may calculate OB and OC according to the following formula:

$$OB = \sqrt{OA^2 + AB^2 - 2 \cdot OA \cdot AB \cdot \cos(\angle OAB)}$$

$$OC = OA^2 + AC^2 - 2 \cdot OA \cdot AC \cdot \cos(\angle OAC)$$

Here, the OA may be directly acquired by the main transmitting apparatus A. After acquiring the positional information of B and C, the main transmitting apparatus A may acquire values of AB and AC, as well as angle values of $\angle OAB$ and $\angle OAC$.

According to an embodiment of the present disclosure, the calculating unit 240 may determine direction information of the beam for the transmitting apparatus according to the positional information of the electronic equipment 200, the one or more auxiliary transmitting apparatuses and the region, as well as direction information of an antenna array of the transmitting apparatus. That is, the calculating unit 240 may determine the direction information of the beam for the auxiliary transmission apparatus according to the positional information of the electronic equipment 200, each auxiliary transmission apparatus and region, as well as direction information of an antenna array of the auxiliary transmission apparatus. Further, the calculating unit 240 may also determine the direction information of the beam for the electronic equipment 200 according to the positional information of the electronic equipment 200, each auxiliary transmitting apparatus and the region, as well as direction information of an antenna array of the electronic equipment 200.

According to an embodiment of the present disclosure, the calculating unit 240 may determine an angle between a direction of a line connecting the transmitting apparatus and the region and a direction of broadside of the antenna array of the transmitting apparatus. The angle is also referred to as Angle of Departure (AoD) of the transmitting apparatus, and direction information of the beam for the transmitting apparatus is determined based on the angle. Here, after acquiring the angle of departure, each transmitting apparatus may determine the direction information of the beam for the transmitting apparatus.

Figure 6:
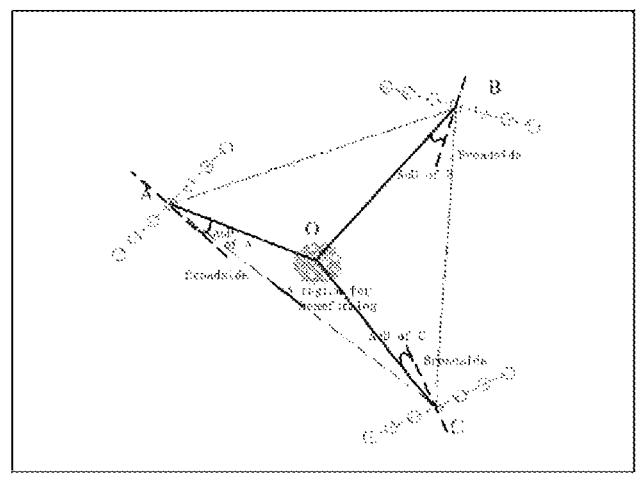
FIG. 6 is a schematic diagram for determining direction information of beam scanning according to an embodiment of the present disclosure.

FIG. 6 is a schematic diagram for determining direction information of a beam according to an embodiment of the present disclosure. As illustrated in FIG. 6, a broadside direction of an antenna array is represented by dashed lines near the antenna array of each transmitting apparatus. Here, the broadside direction of the antenna array refers to a direction perpendicular to both two axes of the antenna array, and the axis indicates arrangement direction of the antenna array. As illustrated in FIG. 6, an angle between the broadside direction of a main transmitting apparatus A and OA is the angle of the departure of the main transmitting apparatus A, an angle between the broadside direction of an auxiliary transmitting apparatus B and OB is the angle of the departure of the auxiliary transmitting apparatus B, and an angle between the broadside direction of an auxiliary transmitting apparatus C and OC is the angle of the departure of the auxiliary transmitting apparatus C. According to an embodiment of the present disclosure, the calculating unit 240 may determine the angle of the departure of each transmitting apparatus.

According to an embodiment of the present disclosure, the calculating unit 240 may calculate a beam scanning angle of each transmitting apparatus based on the positional information of all transmitting apparatuses and the positional information of the region, and determine the angle of the departure of the transmitting apparatus based on the beam scanning angle of each transmitting apparatus and a direction of the antenna array of the transmitting apparatus. Here, beam scanning angle of transmitting apparatus is defined as the following angle between two directions: a direction of a line connecting the transmitting apparatus and the region; and a direction of a line connecting the transmitting apparatus to an adjacent transmitting apparatus. Still referring to FIG. 6 as an example, the angle ∠OAB between OA direction and OB direction is defined as the beam scanning angle of the main transmitting apparatus A. Similarly, the angle ∠OBC may be defined as the beam scanning angle of the auxiliary transmitting apparatus B, and the angle ∠OCA may be defined as the beam scanning angle of the auxiliary transmitting apparatus C.

According to an embodiment of the present disclosure, after acquiring position of the auxiliary transmitting apparatus B and determining position of the region, the calculating unit 240 of the electronic equipment 200 served as the main transmitting apparatus A may directly determine angle value of the angle ∠OAB. Further, the calculating unit 240 may determine angle values of the angles ∠OBC and ∠OCA according to the following formula:

$$\angle OBC = \arccos\left(\frac{OB^2 + BC^2 - OC^2}{2 \cdot OB \cdot BC}\right)$$

-continued
$$\angle OCA = \arccos\left(\frac{OC^2 + AC^2 - OA^2}{2 \cdot OC \cdot AC}\right)$$

Here, arccos represents the inverse cosine function, and values of BC and AC may be calculated after positions of B and C are acquired. The values of OB, OC, and OA have been calculated in a case of calculating power information of the beam for the transmitting apparatus.

Figure 7:
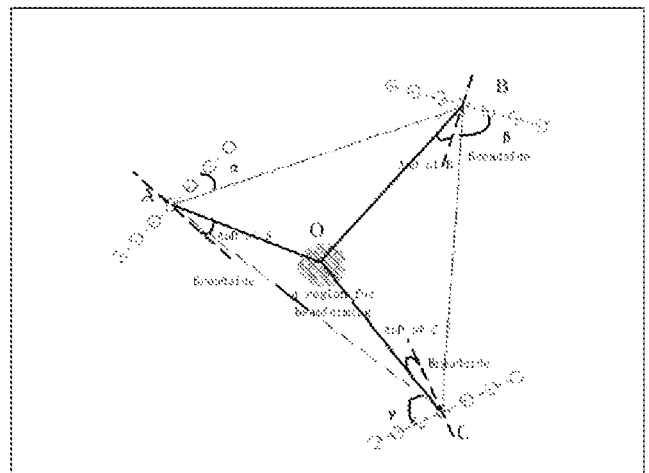
FIG. 7 is a schematic diagram illustrating direction information of an antenna array according to an embodiment of the present disclosure.

According to an embodiment of the present disclosure, the communication unit 220 may receive, from each of the one or more auxiliary transmitting apparatuses, the direction information of the antenna array of the auxiliary transmission apparatus. Here, the direction information of the antenna array is represented by an angle between a direction of an axis of the antenna array of the transmitting apparatus and a direction of a line connecting the transmitting apparatus and an adjacent transmitting apparatus. FIG. 7 is a schematic diagram illustrating direction information of an antenna array according to an embodiment of the present disclosure. As illustrated in FIG. 7, the direction information of the antenna array of the main transmitting apparatus A is represented by an angle α between a direction of an axis of the antenna array of the main transmitting apparatus A and a direction of AB. Similarly, the direction information of the antenna array of the auxiliary transmitting apparatus B is represented by an angle β between a direction of an axis of the antenna array of the auxiliary transmitting apparatus B and a direction of BC, and the direction information of the antenna array of the auxiliary transmitting apparatus C is represented by an angle γ between a direction of an axis of the antenna array of the auxiliary transmitting apparatus C and a direction of AC. Here, each auxiliary transmitting apparatus may report the direction information of the antenna array of the auxiliary transmitting apparatus to the main transmitting apparatus.

According to an embodiment of the present disclosure, after acquiring the direction information of the antenna array of the transmitting apparatus and the beam scanning angle of the transmitting apparatus, the calculating unit 240 may determine the angle of departure of the transmitting apparatus based on the above information.

Figure 8:
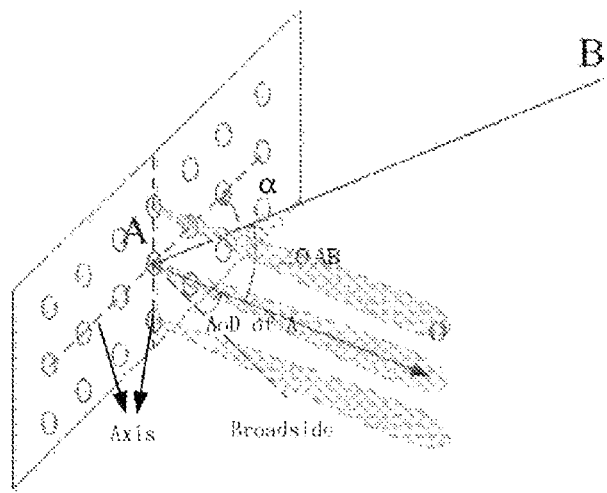
FIG. 8 is a perspective schematic view illustrating an antenna array according to an embodiment of the present disclosure.

FIG. 8 is a perspective schematic view illustrating an antenna array according to an embodiment of the present disclosure. As illustrated in FIG. 8, the antenna array is arranged on an antenna array panel. The antenna array has two axes perpendicular to each other, and a direction perpendicular to the two axes is defined as a broadside direction. Further, an angle α between the axis and AB represents the direction information of the antenna array of the transmitting apparatus A, and an angle ∠OAB between OA and AB is defined as a beam scanning angle of the transmitting apparatus A. An angle between the broadside direction and a direction of OA is defined as an angle of departure of the transmitting apparatus A. As illustrated in FIG. 8, the angle of departure of the transmitting apparatus A may be calculated according to the following formula:

The angle of departure of $A = \pi/2 - \angle OAB - \alpha$.

Similarly, the calculating unit 240 may also calculate angles of departure of the transmitting apparatuses B and C as follows:

The angle of departure of $B = \angle OBC - \pi/2 + \beta$

The angle of departure of $C = \pi/2 - \angle OCA - \gamma$.

According to an embodiment of the present disclosure, in a case that the region for beamforming is a three-dimensional space region, the calculating unit 240 may also calculate angles between AO, BO, and CO and the horizontal direction in a case of calculating the direction information, such that the beams transmitted by the main transmitting apparatus and the auxiliary transmitting apparatus may reach the three-dimensional region. In addition, the calculating unit 240 may also not calculate the above angles, and the beamforming unit 230 may scan a two-dimensional region located on the ground in a case of performing beamforming firstly, and then scan a spatial region of the two-dimensional region.

As described above, the calculating unit 240 may determine the power information of the beam for each transmitting apparatus based on the distance between the transmitting apparatus and the region, and may further determine the direction information of the beam for each transmitting apparatus, for example, using the angle of departure of each transmitting apparatus to represent the direction information of the beam. It should be noted that the calculations of direction information and power information are described above by taking two auxiliary transmitting apparatuses (that is, the line connecting adjacent transmitting apparatuses may form a triangle) as an example, and for the case of taking other numbers of auxiliary transmitting apparatuses as an example, direction information and power information may be calculated in a similar way. Therefore, the communication unit 220 may transmit power information and direction information of a beam for each transmitting apparatus to a corresponding transmitting apparatus. Further, the calculating unit 240 may also transmit direction information and power information of the beam for the electronic equipment 200 to the beamforming unit 230.

According to an embodiment of the present disclosure, the beamforming unit 230 may transmit, based on the direction information and power information of the beam for the electronic equipment 200 calculated by the calculating unit 240, a beam signal to an region for beamforming within a specific time period. That is, the beamforming unit 230 determines a direction for transmitting beam based on the direction information of the beam, and determines the power for transmitting beam based on the power information of the beam. Further, the beamforming unit 230 needs to transmit a beam signal according to the above parameters within a specific time period agreed which is agreed with the auxiliary transmitting apparatus.

According to an embodiment of the present disclosure, the calculating unit 240 may transmit the positional information associated with the region to the auxiliary transmitting apparatus. The positional information associated with the region may include the positional information of the region, such that the auxiliary transmitting apparatus may calculate direction information and power information of the beam. The positional information associated with the region may also include direction information and power information of the beam for the auxiliary transmitting apparatus. That is, a body which calculates the direction information and power information of the beam for the auxiliary transmitting apparatus may be the main transmitting apparatus or may also be the auxiliary transmitting apparatus. After acquiring the direction information and power information of the beam, the main transmitting apparatus and the auxiliary transmitting apparatus may transmit, based on respective parameters, the beam signal to the same region within the specific time period, such that different transmitting apparatuses transmit the beam signal to a region simultaneously.

According to an embodiment of the present disclosure, the main transmitting apparatus and the auxiliary transmitting apparatus are defined for the user equipment. That is, for different user equipments, the main transmitting apparatus and the auxiliary transmitting apparatus may be different. Further, the main transmitting apparatus and the auxiliary transmitting apparatus in the wireless communication system may be selected according to multiple methods. For example, a main transmitting apparatus and an auxiliary transmitting apparatus for the user equipment are determined by a transmitting apparatus which is providing services to the user equipment. For example, a transmitting apparatus providing service to the user equipment may determine that itself serves as a main transmitting apparatus, and determine that one or more transmitting apparatuses adjacent to the transmitting apparatus serve as auxiliary transmitting apparatuses. The specific selection principle may be determined based on actual conditions, which is not limit in the present disclosure. In addition, a main transmitting apparatus and an auxiliary transmitting apparatus may also be determined by all transmitting apparatuses around the user equipment.

That is, according to an embodiment of the present disclosure, as illustrated in FIG. 2, the electronic equipment 200 may further include a determining unit 250 configured to determine that the electronic equipment 200 serves as a main transmitting apparatus, and may select one or more transmitting apparatuses to be served as auxiliary transmitting apparatuses, among multiple transmitting apparatuses in the wireless communication system. Further, the communication unit 220 may transmit indication information to one or more auxiliary transmitting apparatuses, to indicate one or more auxiliary transmitting apparatuses to be served as auxiliary transmitting apparatuses.

According to an embodiment of the present disclosure, the indication information may further include identification information of the main transmitting apparatus and other auxiliary transmitting apparatuses for acquiring, by an auxiliary transmitting apparatus receiving the indication information, information of all transmitting apparatuses for the user equipment. Further, the indication information may further include parameters such as positional information and/or direction information of the antenna array of the main transmitting apparatus and other auxiliary transmitting apparatuses for calculating, by the auxiliary transmitting apparatus, direction information and power information of the beam for the auxiliary transmitting apparatus.

According to an embodiment of the present disclosure, in response to the indication information transmitted by the electronic equipment 200, the auxiliary transmitting apparatus may transmit parameters such as positional information and/or direction information of the antenna array of the auxiliary transmitting apparatus to electronic equipment 200 for calculating, by the electronic equipment 200, direction information and power information of the beam for the auxiliary transmitting apparatus.

According to an embodiment of the present disclosure, the electronic equipment 200 may also transmit identification information of the electronic equipment 200 and one or more auxiliary transmitting apparatuses to the user equipment for obtaining, by the user equipment, information on all transmitting apparatuses for the user equipment. For example, the identification information may be used for the purpose of detecting information from the electronic equipment 200 and one or more auxiliary transmitting apparatuses.

Figure 9:
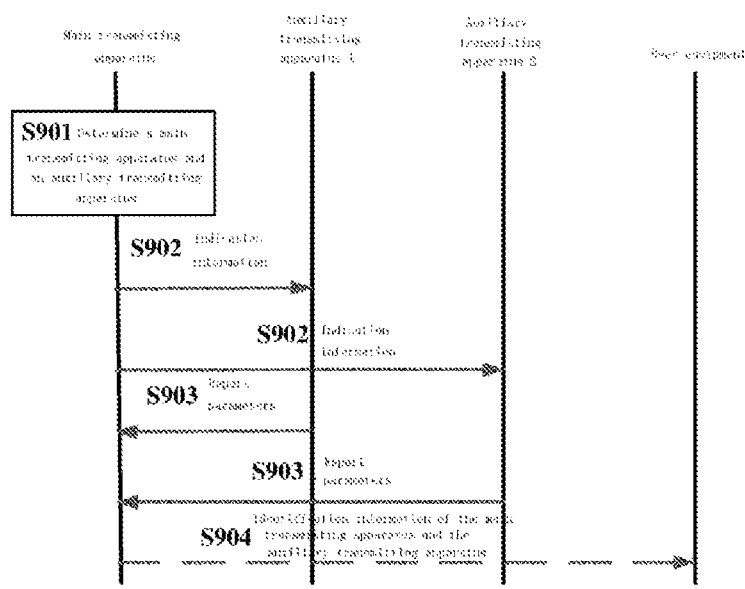
FIG. 9 is a signaling flowchart for determining a main transmitting apparatus and an auxiliary transmitting apparatus according to an embodiment of the present disclosure.

FIG. 9 is a signaling flowchart for determining a main transmission apparatus and an auxiliary transmission apparatus according to an embodiment of the present disclosure. As illustrated in FIG. 9, in step S901, a transmitting apparatus providing services to a user equipment determines the transmitting apparatus to be served as the main transmitting apparatus and determines an auxiliary transmitting apparatus. It is assumed here that the main transmitting apparatus determines two auxiliary transmitting apparatuses for example, an auxiliary transmitting apparatus 1 and an auxiliary transmitting equipment 2. Next, in step S902, the main transmitting apparatus transmits indication information to the auxiliary transmitting apparatus 1 and the auxiliary transmitting apparatus 2 to indicate that the auxiliary transmitting apparatus 1 and the auxiliary transmitting apparatus 2 are served as the auxiliary transmitting apparatus. Next, in step S903, the auxiliary transmitting apparatus 1 and the auxiliary transmitting apparatus 2 respectively report the main transmitting apparatus of parameters, which may include, for example, positional information and/or direction information of an antenna array and the like. Next, alternatively, in step S904, the main transmitting apparatus may transmit identification information of the main transmitting apparatus and the auxiliary transmitting apparatus to the user equipment.

As described above, a main transmitting apparatus and an auxiliary transmitting apparatus for the user equipment may be determined by a transmitting apparatus (for example, a transmitting apparatus which is currently providing services to the user equipment) around the user equipment. Another manner for determining the main transmitting apparatus and the auxiliary transmitting apparatus is described in detail below.

According to an embodiment of the present disclosure, the main transmitting apparatus and the auxiliary transmitting apparatus may also be determined by a base station equipment in a wireless communication system. The base station equipment may be a base station equipment which is currently providing services to the user equipment, for example, a base station equipment including a cell which a transmitting apparatus providing services to the user equipment is located.

According to an embodiment of the present disclosure, the communication unit 220 of the electronic equipment 200 may receive, from the base station equipment in the wireless communication system, indication information for indicating the electronic equipment 200 to be served as a main transmitting apparatus. Further, the indication information may further include identification information of one or more auxiliary transmitting apparatuses for obtaining, by the electronic equipment 200, all auxiliary transmitting apparatuses, which is convenient for subsequent calculation.

According to an embodiment of the present disclosure, the electronic equipment 200 may further include an estimating unit 260 configured to estimate link quality between the electronic equipment 200 and the user equipment. According to an embodiment of the present disclosure, the estimating unit 260 may estimate link quality between the electronic equipment 200 and the user equipment in response to reference signal information from the user equipment. Here, the user equipment may transmit a reference signal to multiple transmitting apparatuses around for estimating, by each of multiple transmitting apparatuses, link quality between the transmitting apparatus and the user equipment.

According to an embodiment of the present disclosure, the communication unit 220 may further transmit link quality information to the base station equipment for determining, by the base station equipment, the main transmitting apparatus and one or more auxiliary transmitting apparatuses according to the link quality information. Here, all transmitting apparatuses around the user equipment may transmit the link quality information to the base station equipment for selecting, by the base station equipment, the main transmitting apparatus and the auxiliary transmitting apparatus. For example, the base station equipment may select a transmitting apparatus having the best link quality to be served as the main transmitting apparatus and select the other transmitting apparatus having the better link quality to be served as the auxiliary transmitting apparatus. The specific selection rules are not limited in the present disclosure.

Figure 10A:
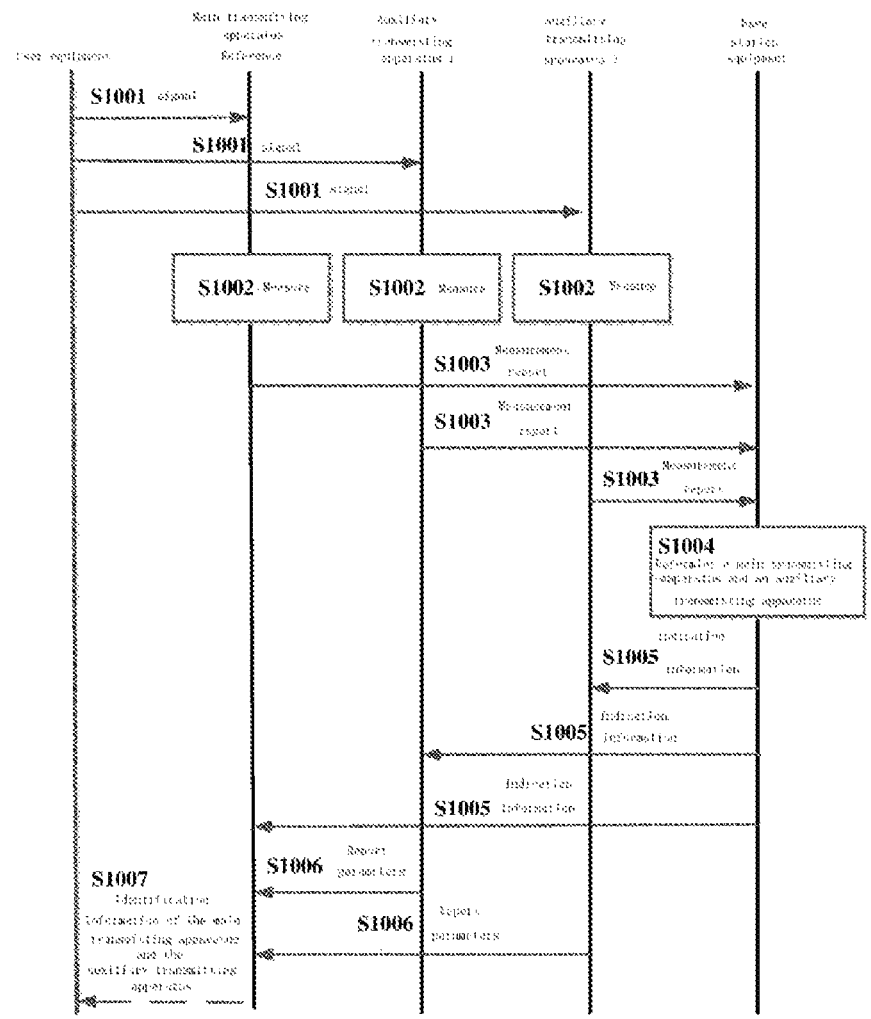
FIG. 10(a) is a signaling flowchart for determining a main transmitting apparatus and an auxiliary transmitting apparatus according to another embodiment of the present disclosure.

FIG. 10(a) is a signaling flowchart for determining a main transmitting apparatus and an auxiliary transmitting apparatus according to another embodiment of the present disclosure. As illustrated in FIG. 10(a), in step S1001, a user equipment transmits a reference signal to all transmitting apparatuses around the user equipment. It is assumed here that the user equipment transmits the reference signal to three transmitting apparatuses. Next, in step S1002, the three transmitting apparatuses measure link quality between the transmitting apparatus and the user equipment in response to the received reference signal. Next, in step S1003, the three transmitting apparatuses transmit measurement reports of link quality measurement to a base station equipment. Next, in step S1004, the base station equipment selects an appropriate main transmitting apparatus and auxiliary transmitting apparatus based on the received measurement report. Next, in step S1005, the base station equipment transmits indication information to the main transmitting apparatus and the auxiliary transmitting apparatus to indicate which transmitting apparatus is served as the main transmitting apparatus and which transmitting apparatuses are served as the auxiliary transmitting apparatus. Next, similar to step S903 in FIG. 9, in step S1006, the auxiliary transmitting apparatus may report related parameters to the main transmitting apparatus. Next, alternatively, similar to step S904 in FIG. 9, in step S1007, the main transmitting apparatus may transmit identification information of the main transmitting apparatus and the auxiliary transmitting apparatus to the user equipment. As illustrated in FIG. 10(a), the base station equipment may determine the main transmitting apparatus and the auxiliary transmitting apparatus based on uplink quality between the user equipment and the transmitting apparatus measured by the transmitting apparatus.

Figure 10B:
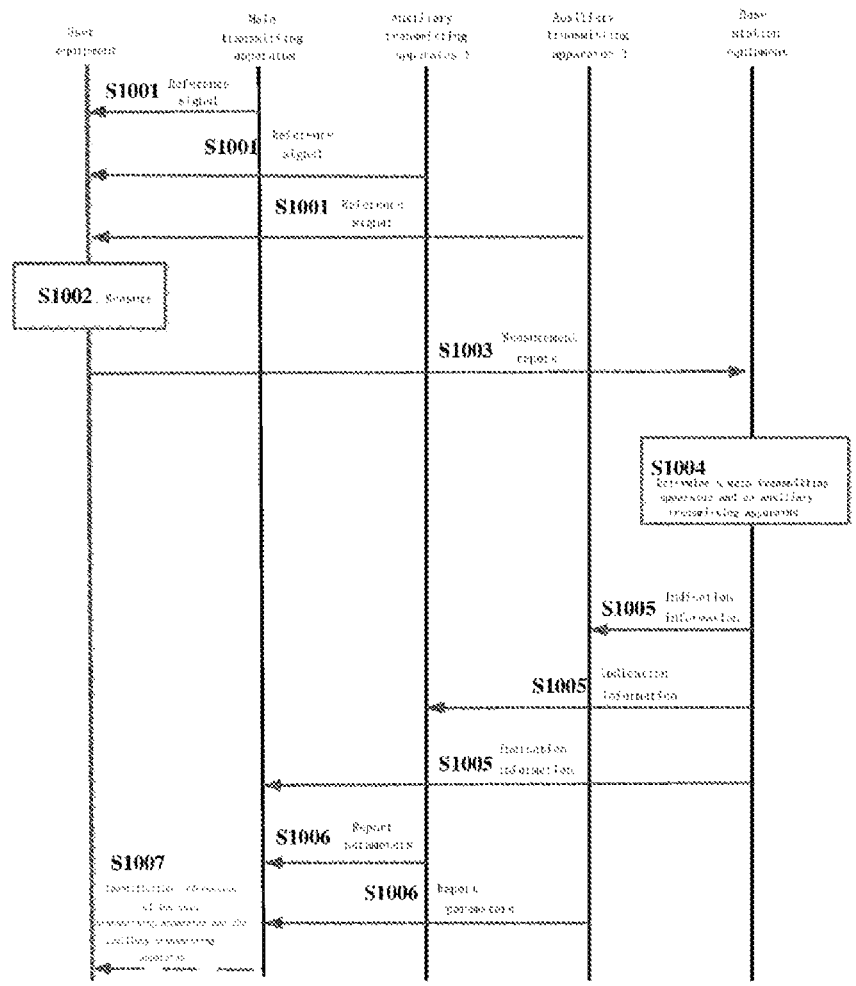
FIG. 10(b) is a signaling flowchart for determining a main transmitting apparatus and an auxiliary transmitting apparatus according to yet another embodiment of the present disclosure.

FIG. 10(b) is a signaling flowchart for determining a main transmitting apparatus and an auxiliary transmitting apparatus according to yet another embodiment of the present disclosure. As illustrated in FIG. 10(b), in step S1001, all transmitting apparatuses around a user equipment transmit a reference signal to the user equipment. It is assumed here that three transmitting apparatuses transmit the reference signal to the user equipment. According to an embodiment of the present disclosure, since transmitting apparatuses around the user equipment may not know position of the user equipment, and cannot transmit a beam signal to the user equipment. In this case, the transmitting apparatus may transmit a reference signal to the user equipment via a common control channel such as a broadcast channel. Next, in step S1002, the user equipment measures downlink quality between the user equipment and multiple transmitting apparatuses respectively in response to the received multiple reference signals. Next, in step S1003, the user equipment transmits a measurement report of link quality measurement to a base station equipment, and the measurement report may include measurement results of link quality for different transmitting apparatuses. Next, in step S1004, the base station equipment selects an appropriate main transmitting apparatus and auxiliary transmitting apparatus based on the received measurement report. Next, in step S1005, the base station equipment transmits indication information to the main transmitting apparatus and the auxiliary transmitting apparatus to indicate which transmitting apparatus is served as the main transmitting apparatus and which transmitting apparatuses are served as the auxiliary transmitting apparatus. Next, similar to step S903 in FIG. 9, in step S1006, the auxiliary transmitting apparatus may report related parameters to the main transmitting apparatus. Next, alternatively, similar to step S904 in FIG. 9, in step S1007, the main transmitting apparatus may transmit identification information of the main transmitting apparatus and the auxiliary transmitting apparatus to the user equipment. As illustrated in FIG. 10(b), the base station equipment may determine the main transmitting apparatus and the auxiliary transmitting apparatus based on downlink quality between the user equipment and the transmitting apparatus measured by the transmitting apparatus.

As described above, the base station equipment may determine the main transmitting apparatus and the auxiliary transmitting apparatus for the user equipment. In this way, link qualities of the selected main transmitting apparatus and auxiliary transmitting apparatus are good, such that signal quality received by the user equipment is also good, thereby facilitating the subsequent beamforming process.

The electronic equipment 200 according to an embodiments of the present disclosure may assist in various communication processes, and makes it possible to locate a user equipment, perform handover for user equipment and CoMP transmission. Configuration of the electronic equipment 200 for implementing the above communication processes is described in detail blow.

<2.2 Configuration for Locating a User Equipment>

According to an embodiment of the present disclosure, since a main transmitting apparatus and an auxiliary transmitting apparatus may transmit a beam signal to a region simultaneously, locating a user equipment may be implemented.

According to an embodiment of the present disclosure, a locating process may be triggered by the user equipment, or may be triggered by a base station equipment providing services to the user equipment. Furthermore, in order to locate, multiple auxiliary transmitting apparatuses are required, that is, at least three transmitting apparatuses transmit a beam signal to a region simultaneously.

According to the embodiments of the present disclosure, since the electronic equipment 200 and the auxiliary transmitting apparatus do not know position of the user equipment, the determining unit 210 of the electronic equipment 200 may determine the region for beamforming based on a probability of the occurrence of the user equipment at various positions, and preferentially select the position with a high probability of the occurrence of the user equipment as the region for beamforming. That is, the region for beamforming is where the user equipment may occur. For example, the electronic equipment 200 may estimate the probability of the occurrence of the user equipment at various positions based on the historical information of the user equipment (for example, information such as the place where the user equipment frequently occurs, the position when the user equipment initially accesses the wireless communication system), and select a region in which the probability of occurrence of the user equipment is highest and which is not yet scanned as the region for beamforming. Here, in the configuration for locating the user equipment, since the main transmitting apparatus and the auxiliary transmitting apparatus do not know the position of the user equipment, the main transmitting apparatus and the auxiliary transmitting apparatus may only transmit the beam signal to each region one by one until the position of the user equipment is determined. The process may also be referred to as a "beam scanning" process. That is, the determined region for beamforming may be referred to as a scanning region, and the period of the beamforming may also be referred to as a scanning period.

According to an embodiment of the present disclosure, the communication unit 220 of the electronic equipment 200 may transmit identification information of the electronic equipment 200 and one or more auxiliary transmitting apparatuses to the user equipment for detecting, by the user equipment, the information from the electronic equipment 200 and one or more auxiliary transmitting apparatuses. That is, no matter which entity determines the main transmitting apparatus and the auxiliary transmitting apparatus, the electronic equipment 200 served as the main transmitting apparatus may transmit identification information of all transmitting apparatuses to the user equipment. In this way, the user equipment may determine which signals from the transmitting apparatus need to be detected to perform locating.

According to an embodiment of the present disclosure, the communication unit 220 may receive, from the user equipment, feedback information for the beam signal transmitted by the electronic equipment 200 and one or more auxiliary transmitting apparatuses. The feedback information may indicate whether the user equipment receives beam signals from all transmitting apparatuses.

According to an embodiment of the present disclosure, only in a case of receiving beam signals from all transmitting apparatuses, the user equipment may transmit feedback information to the main transmitting apparatus. That is, the feedback information indicates that the user equipment receives beam signals from the electronic equipment 200 and all auxiliary transmitting apparatuses. In this way, the electronic equipment 200 may set a timer. If the electronic equipment 200 does not receive the feedback information when the timer expires, it may be determined that the user equipment is not located in the scanned region. If the electronic equipment 200 receives the feedback information when the timer expires, it may be determined that the user equipment is located in the scanned region. In this case, the feedback information may include various parameters for locating, for example, in a case that a Time Difference of Arrival (TDOA) algorithm is used, the feedback information may include information on the arrival time of the beam signal from each transmitting apparatus. In the present disclosure, any algorithm known in the art may be used to locate the user equipment. Therefore, the location algorithm and the feedback information are not limited.

According to an embodiment of the present disclosure, the user equipment may also transmit feedback information to the electronic equipment 200 within each beam scanning period. The feedback information indicates whether the user equipment receives beam signals from all transmitting apparatuses within the last beam scanning period. For example, if the user equipment does not receive beam signals from all transmitting apparatuses in the nth scanning period, the user equipment transmits feedback information to the electronic equipment 200 in the n+1th scanning period, to indicate that the user equipment dose not receive beam signals from all transmitting apparatuses in the nth scanning period. If the user equipment receives beam signals from all transmitting apparatuses in the n+1th scanning period, the user equipment transmits feedback information to the electronic equipment 200 in the n+2 scanning period. The feedback information may include various parameters required for locating. In this way, the electronic equipment 200 may determine that the region scanned in the n+1th scanning period is the position where the user equipment is located, to perform locating.

According to an embodiment of the present disclosure, after receiving feedback information including various parameters required for locating, the electronic equipment 200 may calculate the position of the user equipment, or may transmit the above information to the base station equipment providing services for the user equipment, and the base station equipment calculates the position of the user equipment.

According to an embodiment of the present disclosure, as illustrated in FIG. 2, the electronic equipment 200 may further include a locating unit 270 configured to locate the user equipment according to the feedback information from the user equipment. The location algorithm is not limited in the present disclosure.

According to an embodiment of the present disclosure, in a case that the feedback information received from the user equipment indicates that the user equipment does not receive beam signals from all transmitting apparatuses, or the feedback information from the user equipment is not received when the timer expires, the determining unit 210 may also redetermine a region for beamforming within a specific time period, the communication unit 220 may also transmit information associated with the redetermined region to the one or more auxiliary transmitting apparatuses, and the beamforming unit 230 may also transmit a beam signal to the redetermined region within the specific time period. Here, the determining unit 210 may still select a region in which the probability of the occurrence of the user equipment is highest and which is not scanned, as the region for beamforming, that is, the determining unit 210 may select the region in which the probability of the occurrence of the user equipment is highest as the region for beamforming, among regions which are not scanned. The subsequent processing flow is similar to the process described above, which is not repeated herein. According to an embodiment of the present disclosure, the electronic equipment 200 may repeat such a process until receiving feedback information from the user equipment indicating that the user equipment receives beam signals from all transmitting apparatuses to perform locating.

Figure 11A:
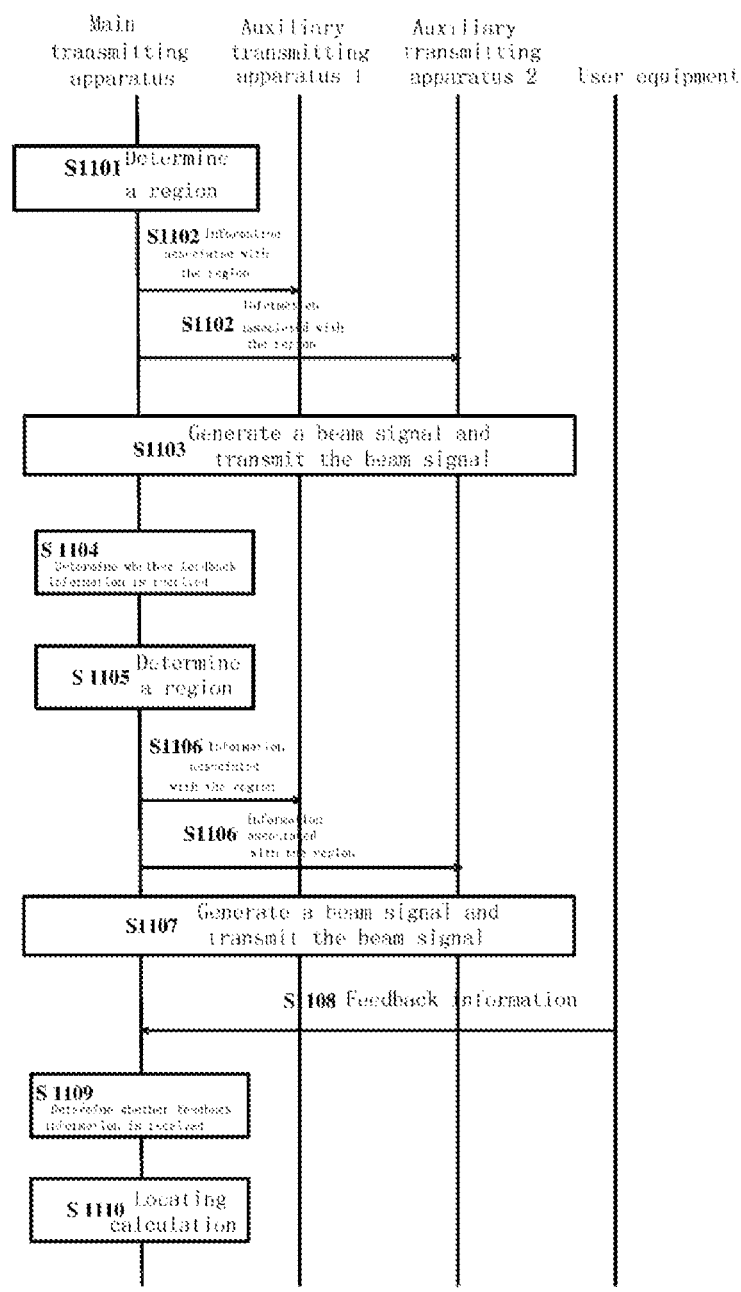
FIG. 11(a) is a signaling flowchart for locating a user equipment according to an embodiment of the present disclosure.

FIG. 11(a) is a signaling flowchart for locating a user equipment according to an embodiment of the present disclosure. FIG. 11(a) illustrates a case that a wireless communication system includes a main transmitting apparatus and two auxiliary transmitting apparatuses. In FIG. 11(a), the user equipment may transmit feedback information to the main transmitting apparatus only in a case of receiving beam signals from all transmitting apparatuses. As illustrated in FIG. 11(a), in step S1101, the main transmitting apparatus determines a region for beamforming. Next, in step S1102, the main transmitting apparatus transmits information associated with the region to the auxiliary transmitting apparatus 1 and the auxiliary transmitting apparatus 2. Next, in step S1103, the main transmitting apparatus and the auxiliary transmitting apparatus simultaneously transmit beam signals to the region. Next, in step S1104, the main transmitting apparatus sets a timer and determines whether feedback information from the user equipment is received when the timer expires. It is assumed here that the main transmitting apparatus does not receive the feedback information from the user equipment when the timer expires. Next, in step S1105, the main transmitting apparatus redetermines a region for beamforming. Next, in step S1106, the main transmitting apparatus transmits information associated with the redetermined region to the auxiliary transmitting apparatus 1 and the auxiliary transmitting apparatus 2. Next, in step S1107, the main transmitting apparatus and the auxiliary transmitting apparatus simultaneously transmit beam signals to the redetermined region. Next, in step S1108, it is assumed that the user equipment transmits feedback information to the main transmitting apparatus when the timer expires. Next, in step S1109, the main transmitting apparatus sets a timer and determines that the feedback information from the user equipment is received when the timer expires. Next, in step S1110, the main transmitting apparatus may perform locating calculation according to the received feedback information.

Figure 11B:
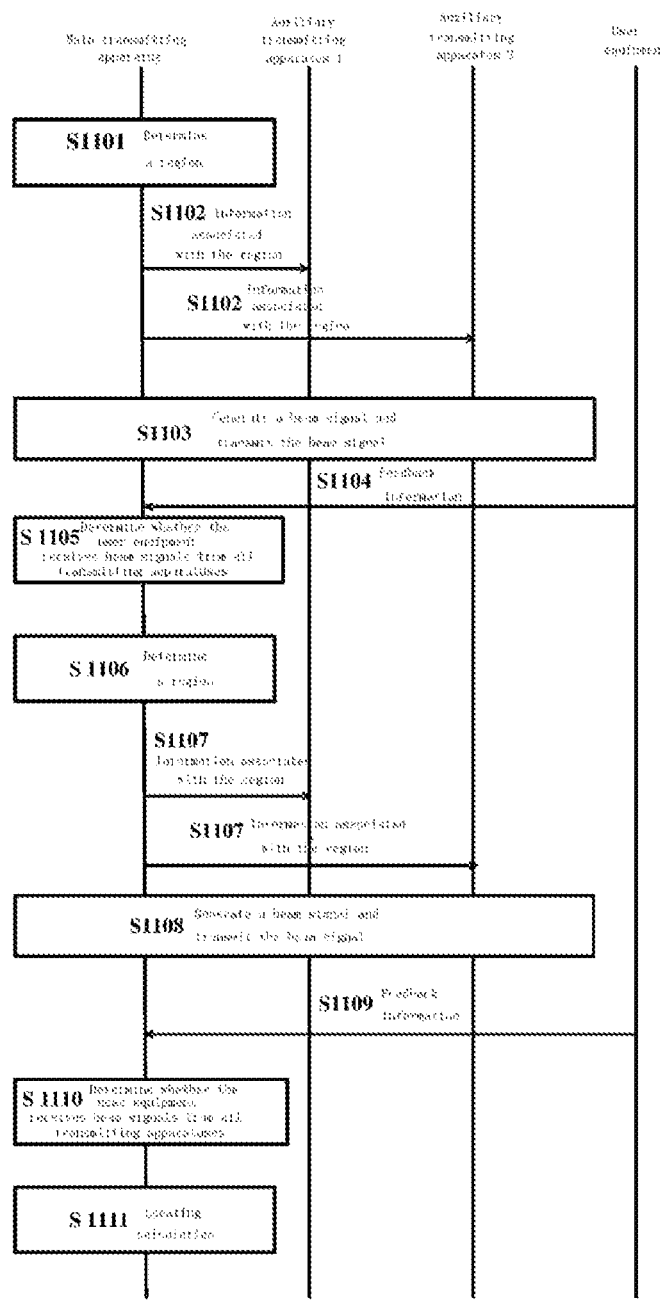
FIG. 11(b) is a signaling flowchart for locating a user equipment according to another embodiment of the present disclosure.

FIG. 11(b) is a signaling flowchart for locating a user equipment according to another embodiment of the present disclosure. FIG. 11(b) illustrates a case that a wireless communication system includes a main transmitting apparatus and two auxiliary transmitting apparatuses. In FIG. 11(b), the user equipment transmits feedback information to the main transmitting apparatus in each beamforming period. The feedback information may indicate whether the user equipment receives beam signals from all transmitting apparatuses in the last beamforming period. As illustrated in FIG. 11(b), in step S1101, the main transmitting apparatus determines a region for beamforming. Next, in step S1102, the main transmitting apparatus transmits information associated with the region to the auxiliary transmitting apparatus 1 and the auxiliary transmitting apparatus 2. Next, in step S1103, the main transmitting apparatus and the auxiliary transmitting apparatus simultaneously transmit beam signals to the region. Next, in step S1104, the user equipment transmits feedback information to the main transmitting apparatus. The feedback information indicates that the user equipment does not receive beam signals from all transmitting apparatuses in the last beamforming period. Next, in step S1105, the main transmitting apparatus determines that the user equipment does not receive beam signals from all transmitting apparatuses according to the feedback information. Next, in step S1106, the main transmitting apparatus redetermines a region for beamforming. Next, in step S1107, the main transmitting apparatus transmits information associated with the redetermined region to the auxiliary transmitting apparatus 1 and the auxiliary transmitting apparatus 2. Next, in step S1108, the main transmitting apparatus and the auxiliary transmitting apparatus simultaneously transmit beam signals to the redetermined region. Next, in step S1109, the user equipment transmits feedback information to the main transmitting apparatus. The feedback information indicates that the user equipment receives beam signals from all transmitting apparatuses in the last beamforming period. Next, in step S1110, the main transmitting apparatus determines that the user equipment receives beam signals from all transmitting apparatuses. Next, in step S1111, the main transmitting apparatus may perform locating calculation according to the received feedback information.

Figure 12A:
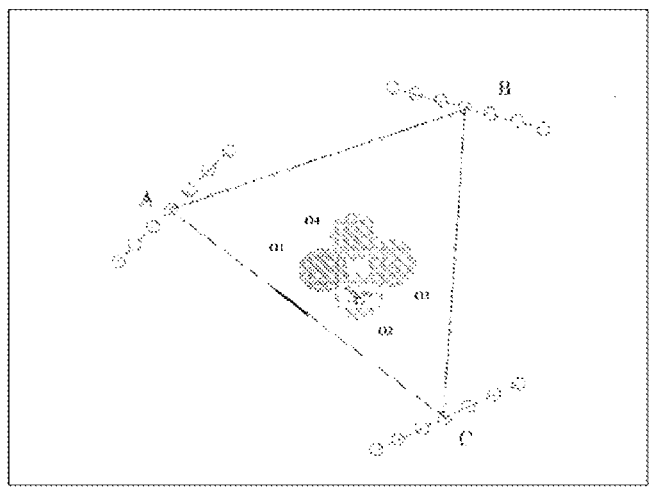
FIG. 12(a) is a schematic diagram for locating a user equipment according to an embodiment of the present disclosure.

FIG. 12(a) is a schematic diagram for locating a user equipment according to an embodiment of the present disclosure. As illustrated in FIG. 12(a), the main transmitting apparatus may perform a priority level ranking to multiple regions according to historical information from the user equipment, and set the multiple regions as regions for beamforming in an order from the highest priority to the lowest priority. Here, the setting of priority level setting may be for example, based on a level of probability of the occurrence of the user equipment, the higher the probability of the occurrence of the user equipment, the higher the priority level of the region. It is assumed here that the priority level of four regions O1, O2, O3, and O4 decrease in sequence, and the user equipment that needs to be located is located in the region O2.

Figure 12B:
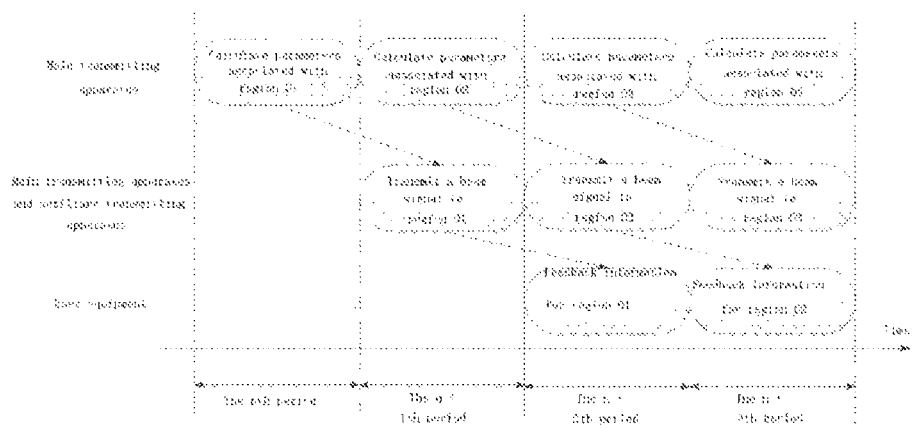
FIG. 12(b) is a timing diagram for locating a user equipment according to an embodiment of the present disclosure.

FIG. 12(b) is a timing diagram for locating a user equipment according to an embodiment of the present disclosure for the case illustrated in FIG. 12(a). In FIG. 12(b), a manner that the user equipment reports feedback information in each beamforming period is used. As illustrated in FIG. 12(b), in the nth period, a main transmitting apparatus determines a region O1 as a region for beamforming, and calculates parameters associated with the region O1 (for example, positional information of the region O1, and direction information and power information of a beam for the main transmitting apparatus and an auxiliary transmitting apparatus). Further, in the nth period, the main transmitting apparatus transmits information associated with the region O1 to the auxiliary transmitting apparatus. Next, in the n+1th scanning period, the main transmitting apparatus and the auxiliary transmitting apparatus may generate a beam and transmit a beam signal to the region O1 simultaneously. In addition, in the n+1th period, the main transmitting apparatus also determines a region O2 as a region for beamforming, calculates parameters associated with the region O2, and transmits the calculated parameters to the auxiliary transmitting apparatus. Next, in the n+2 period, the main transmitting apparatus and the auxiliary transmitting apparatus may generate a beam and transmit a beam signal to the region O2 simultaneously. In addition, in the n+2 period, the user equipment may transmit feedback information to the main transmitting apparatus to indicate whether the user equipment receives beam signals from all transmitting apparatuses in the n+1th period. It is assumed here that feedback information from the user equipment indicates that beam signals from all transmitting apparatuses are not received in the n+1th period. That is, the user equipment is not located in the region O1. In the n+2th period, the main transmitting apparatus also determines a region O3 as a region for beamforming, calculates parameters associated with the region O3, and transmits the calculated parameters to the auxiliary transmitting apparatus. Next, in the n+3th period, the main transmitting apparatus and the auxiliary transmitting apparatus may generate a beam and transmit a beam signal to the region O3 simultaneously. In addition, in the n+3th period, the user equipment may transmit feedback information to the main transmitting apparatus to indicate whether the user equipment receives beam signals from all transmitting apparatuses in the n+2th period. It is assumed here that feedback information from the user equipment indicates that beam signals from all transmitting apparatuses are received in the n+2th period. That is, the user equipment is located in the region O2. In this case, the main transmitting apparatus determines a region O4 as a region for beamforming, calculates parameters associated with the region O4 and transmits the calculated parameters to the auxiliary transmitting apparatus. Since it takes some time for the main transmitting apparatus to receive the feedback information, a part of the parameters associated with the region O4 may be calculated. After receiving feedback information indicating that the user equipment receives beam signals from all transmitting apparatuses in the n+2th period, the main transmitting apparatus stops calculating parameters immediately and locate the user equipment according to the feedback parameters.

As described above, the electronic equipment 200 according to an embodiment of the present disclosure may determine different regions as regions for beamforming in sequence, and scan each region with the auxiliary transmitting apparatus simultaneously until the position of user equipment is determined. Here, since the user equipment may move, multiple transmitting apparatuses transmitting beams simultaneously can implement a more accurate locating effect.

<2.3 Configuration for Handover for a User Equipment>

Handover is performed in a case that a user equipment moves from a coverage range of a transmitting apparatus (such as a TRP or a base station) to a coverage range of another transmitting apparatus. In the process of handover, in order to maintain a stable connection, a "soft handover" manner is usually used, that is, the user equipment connect to multiple transmitting apparatuses firstly and then disconnecting a connection with the transmitting apparatus which previously provides services. In order to implement "soft handover", the user equipment needs to receive signals transmitted from multiple transmitting apparatuses simultaneously. In a handover process, the user equipment need to generate three sets: an active set, a neighbor set, and a candidate set, and maintains connections with transmitting apparatuses included in these sets. The active set refers to a set formed by a transmitting apparatus which is performing "soft handover" with the user equipment. The candidate set refers to a set formed by a transmitting apparatus which satisfies the following conditions: the transmitting apparatus is not in the active set, and does not perform soft handover, but there is sufficient pilot strength to indicate that the transmitting apparatus may be added to the active set. The neighbor set (monitoring set) refers to a set formed by a transmitting apparatus which is not currently in the candidate set and are considered to be added to the candidate set according to a certain algorithm. The mobile station continuously searches for and measures cells listed in the neighbor set. In the time of measurement, the pilot strength is not strong enough to be added to the candidate set.

In a wireless communication system using beamforming, signals are transmitted in a form of a beam formed by analog/digital precoding. In this case, in order to implement "soft handover", beams transmitted by multiple transmitting apparatuses are required to transmit to the user equipment simultaneously. Therefore, the electronic equipment 200 according to an embodiment of the present disclosure may be applied to such process.

In an embodiment for handover, since position of the user equipment is known, the determining unit 210 may determine a region for beamforming within a specific time based on positional information of the user equipment. That is, the user equipment is located in a determined region.

According to an embodiment of the present disclosure, the electronic equipment 200 or the base station equipment which provides services for the user equipment may also determine a transmitting apparatus having the strongest received signal power (or the maximum signal-to-noise ratio) in the active set as a main transmitting apparatus. Other transmitting apparatuses in the active set as well as transmitting apparatuses in the candidate set and the neighbor set serve as auxiliary transmitting apparatuses.

According to an embodiment of the present disclosure, in a case that the electronic equipment 200 belongs to the active set, the electronic equipment 200 transmits a control signal and a data signal to the region through the beam. In a case that the electronic equipment 200 belongs to the candidate set or the neighbor set, the electronic equipment 200 transmits a control signal to the region through the beam. Similarly, in a case that the auxiliary transmitting apparatus belongs to the active set, the auxiliary transmitting apparatus transmits a control signal and a data signal to the region through the beam. In a case that the auxiliary transmitting apparatus belongs to the candidate set or the neighbor set, the auxiliary transmitting apparatus transmits a control signal to the region through the beam.

According to an embodiment of the present disclosure, the user equipment may determine the transmitting apparatuses in the active set, the candidate set, and the neighbor set based on the received beam signals from all transmitting apparatuses. For example, if the strength of the control signal transmitted by a transmitting apparatus in the candidate set via the beam is strong enough and the active set is not full, the transmitting apparatus is moved into the active set. If the strength of the control signal transmitted by the transmitting apparatus in the neighbor set via the beam is strong enough, and the candidate set is not full, the transmitting apparatus is moved into the candidate set. If the strength of the control signal transmitted by the transmitting apparatus in the active set via the beam becomes poor, and the candidate set is not full, the transmitting apparatus is moved into the candidate set. If the strength of the control signal transmitted by the transmitting apparatus in the candidate set via the beam becomes poor, and the neighbor set is not full, the transmitting apparatus is moved into the neighbor set.

According to an embodiment of the present disclosure, the electronic equipment 200 may track position of the user equipment, and in a case of determining that the user equipment moves, the electronic equipment 200 may perform the above process again according to position after movement. That is, the determining unit 210 may redetermine a region for beamforming within a specific time period according to positional information of the user equipment after movement, and the communication unit 220 may transmit information associated with the redetermined region to the one or more auxiliary apparatuses for transmitting the beam signal to the redetermined region by the one or more auxiliary transmitting apparatuses within a specific time period, and the beamforming unit 230 may transmit the beam signal to the redetermined region within the specific time period. Similarly, the region redetermined by the determining unit 210 is also determined according to the position of the user equipment after movement. The subsequent process is similar to that described above, which is not repeated herein.

As described above, the electronic equipment 200 according to an embodiment of the present disclosure may determine a region for beamforming according to position of a user equipment, such that the electronic equipment 200 and the auxiliary transmitting apparatus transmit a beam signal to a region simultaneously to facilitate the user equipment to more accurately determine the set related to handover to implement soft handover.

<2.4 Configuration for CoMP>

CoMP refers to that multiple transmitting apparatuses provide services to a user equipment simultaneously by cooperating with each other. These transmitting apparatuses are geographically separated and wirelessly connect through related interfaces or optical fibers. CoMP improves spectral efficiency at the cell edge and expands the coverage of the cell by using macro-diversity technology. Downlink CoMP may be classified as multipoint joint processing and coordinated multipoint scheduling according to different data processing manners. In the multipoint joint processing manner, multiple transmitting apparatuses need to transmit data to the user equipment simultaneously.

In a wireless communication system using beamforming, signals are transmitted in a form of a beam by analog/digital precoding. In this case, in order to implement multipoint joint processing, beams transmitted by multiple transmitting apparatuses are required to transmit to the user equipment simultaneously. Therefore, the electronic equipment 200 according to an embodiment of the present disclosure may be applied to such process.

In an embodiment for CoMP transmission, since position of the user equipment is known, the determining unit 210 may determine a scanning region for beamforming within a specific time period according to positional information of the user equipment. That is, the user equipment is located in a determined region.

According to an embodiment of the present disclosure, the electronic equipment 200 and the auxiliary transmitting apparatus may transmit a data signal to the region via a beam.

According to an embodiment of the present disclosure, the electronic equipment 200 may track position of the user equipment, and in a case of determining that the user equipment moves, the electronic equipment 200 may perform the above process again according to position after movement. That is, the determining unit 210 may redetermine a region for beamforming within a specific time period according to positional information of the user equipment after movement, and the communication unit 220 may transmit information associated with the redetermined region to the one or more auxiliary apparatuses for transmitting the beam signal to the redetermined region by the one or more auxiliary transmitting apparatuses within a specific time period, and the beamforming unit 230 may transmit the beam signal to the redetermined region within the specific time period. Similarly, the region redetermined by the determining unit 210 is also determined according to the position of the user equipment after movement. The subsequent process is similar to that described above, which is not repeated herein.

It can be seen that, the electronic equipment 200 according to an embodiment of the present disclosure may determine a region for beamforming according to position of a user equipment, such that the electronic equipment 200 and the auxiliary transmitting apparatus transmit a beam signal to a region simultaneously, and therefore, multiple transmitting apparatus provide services to a use equipment simultaneously by cooperating with each other.

It can be seen that, according to an embodiment of the present disclosure, the main transmitting apparatus may determine a region for beamforming and transmit information associated with the region to the auxiliary transmitting apparatus, such that the main transmitting apparatus and the auxiliary transmitting apparatus transmit the beam signal to the region simultaneously, to implement the synchronization between beams. Further, such process facilitate communication process, such as locating, handover, and CoMP.

3. Configuration Example of an Auxiliary Transmitting Apparatus

Figure 13:
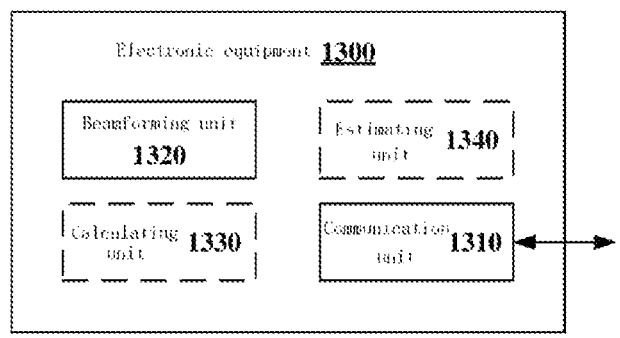
FIG. 13 is a block diagram illustrating a structure of an electronic equipment served as an auxiliary transmitting apparatus according to an embodiment of the present disclosure.

FIG. 13 is a block diagram illustrating a structure of an electronic equipment 1300 served as an auxiliary transmitting apparatus in a wireless communication system according to an embodiment of the present disclosure. The wireless communication system may include a main transmitting apparatus and one or more auxiliary transmitting apparatuses. As illustrated in FIG. 13, the electronic equipment 1300 may include a communication unit 1310 and a beamforming unit 1320.

Here, various units of the electronic equipment 1300 may be included in a processing circuit. It should be noted that, the electronic equipment 1300 may include not only a processing circuit, but also one or more processing circuits. Further, the processing circuit may include various discrete functional units for performing various different functions and/or operations. It should be noted that, these functional units may be physical entities or logical entities, and units with different names may be implemented by the same physical entity.

Furthermore, although FIG. 2 and FIG. 13 illustrate block diagrams of a structure of the main transmitting apparatus and the auxiliary transmitting apparatus, respectively, the electronic equipment 1300 illustrated in FIG. 13 and the electronic equipment 200 illustrated in FIG. 2 both are transmitting apparatuses. Therefore, structures of the electronic equipment 1300 and the electronic equipment 200 are the same. That is, in a case that the transmitting apparatus is served as the main transmitting apparatus, the transmitting apparatus has the structure illustrated in FIG. 2. In a case that the transmitting apparatus is served as the auxiliary transmitting apparatus, the transmitting apparatus has the structure illustrated in FIG. 13 (in this case, the auxiliary transmitting apparatus also includes a determining unit and a locating unit, but not in use).

According to an embodiment of the present disclosure, the communication unit 1310 may receive, from a main transmitting apparatus in a wireless communication system, information associated with a region for beamforming within a specific time period. The main transmitting apparatus may be the electronic equipment 200 described above.

According to an embodiment of the present disclosure, the beamforming unit 1320 may transmit a beam signal to the region within a specific time period. Here, the main transmitting apparatus and the electronic equipment 1300 transmit the beam signal to the scanning region simultaneously within the specific time period.

According to an embodiment of the present disclosure, the information associated with the region received by the communication unit 1310 includes positional information of the region.

As illustrated in FIG. 13, the electronic equipment 1300 may further include a calculating unit 1330 configured to determine power information of the beam for the electronic equipment 1300 according to positional information of the electronic equipment 1300 and the positional information of the region. Here, a manner for calculating power information by the calculating unit 1330 is the same manner as a manner for calculating, by the calculating unit 240 of the electronic equipment 200, power information of beams for the main transmitting apparatus and the auxiliary transmitting apparatus, which are not described herein.

According to an embodiment of the present disclosure, the calculating unit 1330 may further determine direction information of the beam for the electronic equipment 1300 according to positional information of the electronic equipment 200, other auxiliary transmitting apparatuses in the wireless communication system, the main transmitting apparatuses and the regions as well as direction information of an antenna array of the electronic equipment 1300. Similarly, a manner for calculating direction information by the calculating unit 1330 is the same manner as a manner for calculating, by the calculating unit 240 of the electronic equipment 200, direction information of the beams for the main transmitting apparatus and the auxiliary transmitting apparatus, which are not described herein.

According to an embodiment of the present disclosure, the information associated with the region received by the communication unit 1310 may further include direction information and power information of the beam for the electronic equipment 1300. In this case, the communication unit 1310 may transmit direction information of the antenna array of the electronic equipment 1300 to the main transmitting apparatus for calculating, by the main transmitting apparatus, the direction information and power information of the beam for the electronic equipment 1300.

That is, according to an embodiment of the present disclosure, the body which calculates direction information and power information of the beam for the auxiliary transmitting apparatus may be the main transmitting apparatus or may be the auxiliary transmitting apparatus itself. The method for calculating, by the main transmitting apparatus, the direction information and power information is the same as the method for calculating, by the auxiliary transmitting apparatus, the direction information and power information.

According to an embodiment of the present disclosure, the beamforming unit 1320 may transmit the beam signal to the region within the specific time period according to direction information and power information of the beam for the electronic equipment 1300 calculated by the calculating unit 1330, or according to direction information and power information of the beam for the electronic equipment 1300 received by the communication unit 1310. That is, the beamforming unit 1320 determines the direction of transmitting the beam according to the direction information of the beam, and determines the power of transmitting the beam according to power information of the beam. Further, the beamforming unit 1320 needs to transmit the beam signal according to the above parameters within a specific time period that is agreed with the main transmitting apparatus.

According to an embodiment of the present disclosure, the specific time period may be next beamforming period.

According to an embodiment of the present disclosure, the communication unit 1310 may receive, from the main transmitting apparatus, indication information for indicating the electronic equipment 1300 to be served as an auxiliary transmitting apparatus and including identification information of the main transmitting apparatus and other auxiliary transmitting apparatuses. In this case, the main transmitting apparatus and the auxiliary transmitting apparatus are determined by the transmitting apparatus, and the transmitting apparatus determines that the transmitting apparatus itself serves as the main transmitting apparatus and may select the transmitting apparatus to be served as the auxiliary transmitting apparatus.

According to an embodiment of the present disclosure, the communication unit 1310 may receive, from a base station equipment in the wireless communication system, indication information for indicating the electronic equipment 1300 to be served as an auxiliary transmitting apparatus and including identification information of the main transmitting apparatus and other auxiliary transmitting apparatuses. In this case, the main transmitting apparatus and the auxiliary transmitting apparatus are determined by the base station equipment.

As illustrated in FIG. 13, the electronic equipment 1300 may include an estimating unit 1340 configured to estimate link quality between the electronic equipment 1300 and a user equipment. Further, the estimating unit 1340 may estimate link quality between the electronic equipment 1300 and the user equipment in response to a reference signal from the user equipment. Further, the communication unit 1310 may also transmit link quality information to the base station equipment for determining, by the base station equipment, the main transmitting apparatus and one or more auxiliary transmitting apparatuses according to the link quality information.

The electronic equipment 200 according to an embodiment of the present disclosure may serve as a main transmitting apparatus for a user equipment, and the electronic equipment 1300 may serve as an auxiliary transmitting apparatus. Therefore, all embodiments regarding the electronic equipment 200 as described above are applicable thereto.

4. Configuration Example of a User Equipment

Figure 14:
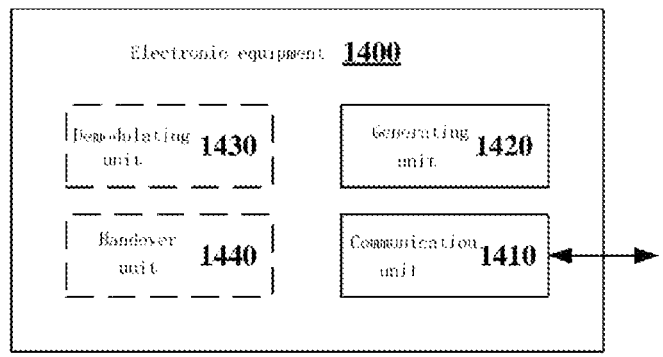
FIG. 14 is a block diagram illustrating a structure of an electronic equipment served as a user equipment according to an embodiment of the present disclosure.

FIG. 14 is a block diagram illustrating a structure of an electronic equipment 1400 served as a user equipment according to an embodiment of the present disclosure. The wireless communication system may include a main transmitting apparatus and one or more auxiliary transmitting apparatuses. As illustrated in FIG. 14, the electronic equipment 1400 may include a communication unit 1410 and a generating unit 1420.

Here, various units of the electronic equipment 1400 may be included in a processing circuit. It should be noted that, the electronic equipment 1400 may include not only a processing circuit, but also one or more processing circuits. Further, the processing circuit may include various discrete functional units for performing various different functions and/or operations. It should be noted that, these functional units may be physical entities or logical entities, and units with different names may be implemented by the same physical entity.

According to an embodiment of the present disclosure, the communication unit 1410 may receive a beam signal simultaneously generated and transmitted by a main transmitting apparatus and one or more auxiliary transmitting apparatuses in the wireless communication system within a specific time period.

According to an embodiment of the present disclosure, the generating unit 1420 may generate feedback information for locating the electronic equipment 1400 based on the received beam signal. Here, the electronic equipment 1400 may perform various processes after receiving the beam signal. For example, in a case that the electronic equipment 1400 is located, the generating unit 1420 may generate feedback information based on the received beam signal. Further, as illustrated in FIG. 14, the electronic equipment 1400 may further include a demodulating unit 1430 and/or a handover unit 1440. In a case that CoMP transmission is performed, the demodulating unit 1430 may demodulate the received beam signal. In a case that a handover of the electronic equipment 1400 is performed, the handover unit 1440 may determine the transmitting apparatuses in an active set, a candidate set, and a neighbor set based on the received beam signal.

The electronic equipment 200 according to an embodiment of the present disclosure may serve as the main transmitting apparatus for the electronic equipment 1400, and the electronic equipment 1300 may serve as the auxiliary transmitting apparatus for the electronic equipment 1400. Therefore, all embodiments of the electronic equipment 200 and the electronic equipment 1300 described as described above are applicable thereto.

5. Method Embodiments

<5.1 Flowchart of a Method Executed by a Main Transmitting Apparatus>

A wireless communication method executed by an electronic equipment 200 served as a main transmitting apparatus in a wireless communication system according to an embodiment of the present disclosure is described in detail below.

Figure 15:
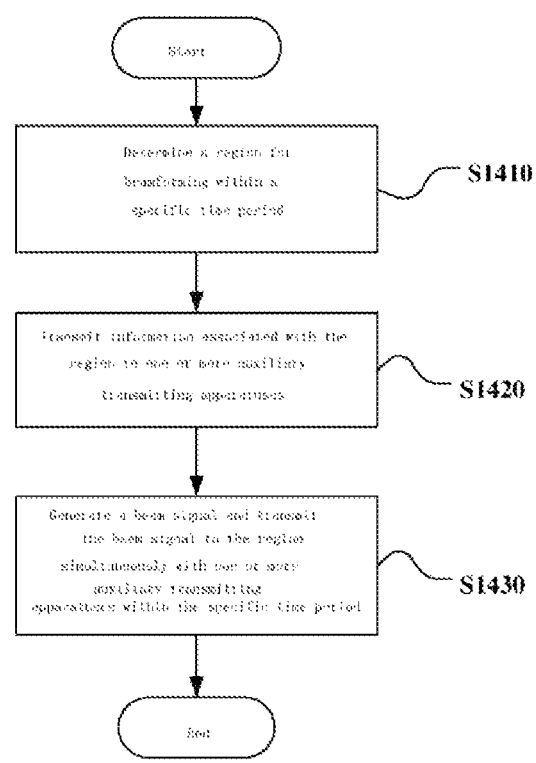
FIG. 15 is a flowchart illustrating a wireless communication method executed by an electronic equipment served as a main transmitting apparatus in a wireless communication system according to an embodiment of the present disclosure.

FIG. 15 is a flowchart illustrating a wireless communication method executed by an electronic equipment 200 served as a main transmitting apparatus in a wireless communication system according to an embodiment of the present disclosure.

As illustrated in FIG. 15, in step S1410, a region for beamforming within a specific time period is determined.

Next, in step S1420, information associated with the region is transmitted to one or more auxiliary transmitting apparatuses in the wireless communication system for generating a beam signal and transmitting the beam signal to the region by the one or more auxiliary transmitting apparatuses within the specific time period.

Next, in step S1430, a beam signal is generated and the beam signal is transmitted to the region simultaneously with the one or more auxiliary transmitting apparatuses within the specific time period.

Preferably, the information associated with the region includes positional information of the region, and the positional information is used for determining direction information and power information of the beam by the one or more auxiliary transmitting apparatuses.

Preferably, the information associated with the region includes direction information and power information of the beam for each of the one or more auxiliary transmitting apparatuses.

Preferably, the method further includes: determining power information of the beam for each auxiliary transmitting apparatus according to positional information of each auxiliary transmitting apparatus and the positional information of the region.

Preferably, the method further includes: determining direction information of the beam for each auxiliary transmitting apparatus according to the positional information of the electronic equipment, the one or more auxiliary transmitting apparatuses and the region as well as the direction information of an antenna array of the one or more auxiliary transmitting apparatuses.

Preferably, the method further includes: receiving, from each of the one or more auxiliary transmitting apparatuses, the direction information of the antenna array of the auxiliary transmitting apparatus.

Preferably, the method further includes: determining direction information and power information of the beam for the electronic equipment; and generating a beam signal within the specific time period according to the direction information and power information.

Preferably, the method further includes: receiving, from a user equipment, feedback information for the beam signal transmitted by the electronic equipment and the one or more auxiliary transmitting apparatuses; and locating the user equipment according to the feedback information.

Preferably, the method further includes: setting a timer, in case of not receiving from the user equipment the feedback information for the beam signal transmitted by the electronic equipment and the one or more auxiliary transmitting apparatuses when the timer expires, executing operations of: redetermining a region for beamforming within a specific time period; transmitting information associated with the redetermined region to the one or more auxiliary transmitting apparatuses; and generating a beam signal and transmitting the beam signal to the redetermined region within the specific time period.

Preferably, the specific time period is next beamforming period.

Preferably, the method further includes: receiving, from a base station equipment in the wireless communication system, indication information for indicating the electronic equipment to be served as a main transmitting apparatus and including identification information of the one or more auxiliary transmitting apparatuses.

Preferably, the method further includes: estimating link quality between the electronic equipment and a user equipment; and transmitting link quality information to the base station equipment for determining, by the base station equipment, the main transmitting apparatus and one or more auxiliary transmitting apparatuses according to the link quality information.

Preferably, the method further includes: transmitting identification information of the electronic equipment and the one or more auxiliary transmitting apparatuses to a user equipment for detecting, by the user equipment, information from the electronic equipment and the one or more auxiliary transmitting apparatuses.

Preferably, the method further includes: determining a region for beamforming within a specific time period according to positional information of a user equipment.

Preferably, the method further includes: performing, when it is determined that the user equipment moves, operations of: redetermining a region for beamforming within a specific time period according to positional information of the user equipment after movement; transmitting information associated with the redetermined region to the one or more auxiliary transmitting apparatuses for generating a beam signal and transmitting the beam signal to the redetermined region by one or more auxiliary transmitting apparatuses within the specific time period; and generating a beam signal and transmitting the beam signal to the redetermined region within the specific time period.

According to an embodiment of the present disclosure, a body which executes the above method may be the electronic equipment 200 according to an embodiment of the present disclosure. Therefore, all embodiments regarding the electronic equipment 200 as described above are applicable thereto.

<5.2 Flowchart of a Method for Locating a User Equipment>

Figure 16:
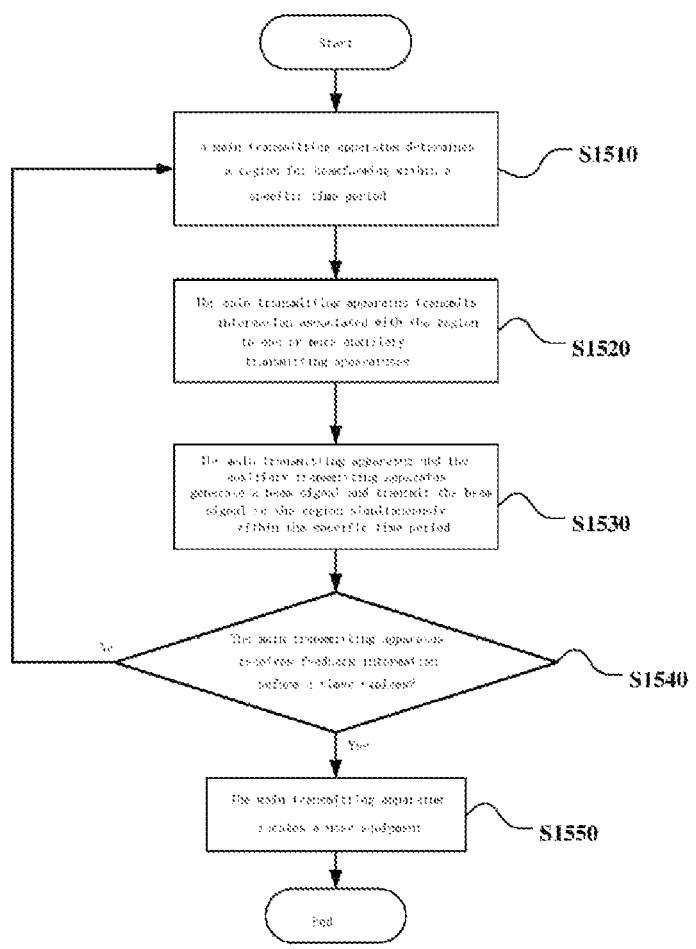
FIG. 16 is a flowchart illustrating a method for locating a user equipment according to an embodiment of the present disclosure.

FIG. 16 is a flowchart illustrating a method for locating a user equipment according to an embodiment of the present disclosure.

As illustrated in FIG. 16, in step S1510, a main transmitting apparatus in a wireless communication system determines a region for beamforming within a specific time period. Next, in step S1520, the main transmitting apparatus transmits information associated with the region to one or more auxiliary transmitting apparatuses. Here, any one of the methods as described above may be used to determine the main transmitting apparatus and one or more auxiliary transmitting apparatuses in the wireless communication system, and the information associated with the region may also be any kind of information as described above. Next, in step S1530, the main transmitting apparatus and the auxiliary transmitting apparatus simultaneously transmit a beam signal to the region within a specific time period. According to an embodiment of the present disclosure, the main transmitting apparatus may set a timer and determine, in step S1540, whether feedback information from the user equipment is received when the timer expires. Here, if the user equipment is located in the region, the user equipment receives the information from the main transmitting apparatus and the auxiliary transmitting apparatus, and generates, based on the received information, feedback information to be transmitted to the main transmitting apparatus. If the user equipment is not located in the region, the user equipment dose not receive information from the main transmitting apparatus and the auxiliary transmitting apparatus, and therefore, the main transmitting apparatus dose not receive feedback information. Next, if the main transmitting apparatus receives feedback information when the timer expires in step S1540, then, in step S1550, the main transmitting apparatus may locate the user equipment according to the feedback information. Here, the method for locating may include, but is not limited to a TDOA algorithm. Next, if the main transmitting apparatus does not receive the feedback information when the timer expires in step S1540, the processing returns to step S1510. In this case, the main transmitting apparatus redetermines a scanning region for beamforming within a specific time period, and the redetermined region does not overlap with the previously determined region, and in this case, the specific time period may be next beamforming period.

As illustrated in FIG. 16, the main transmitting apparatus may change a region for beamforming (that is, a scanning region) until the user equipment is scanned. In this way, the user equipment may receive the beam signal transmitted simultaneously by the main transmitting apparatus and the auxiliary transmitting apparatus via the beam, thereby locating the user equipment by using various methods for locating.

<5.3 Flowchart of a Method for Performing Handover of a User Equipment>

Figure 17:
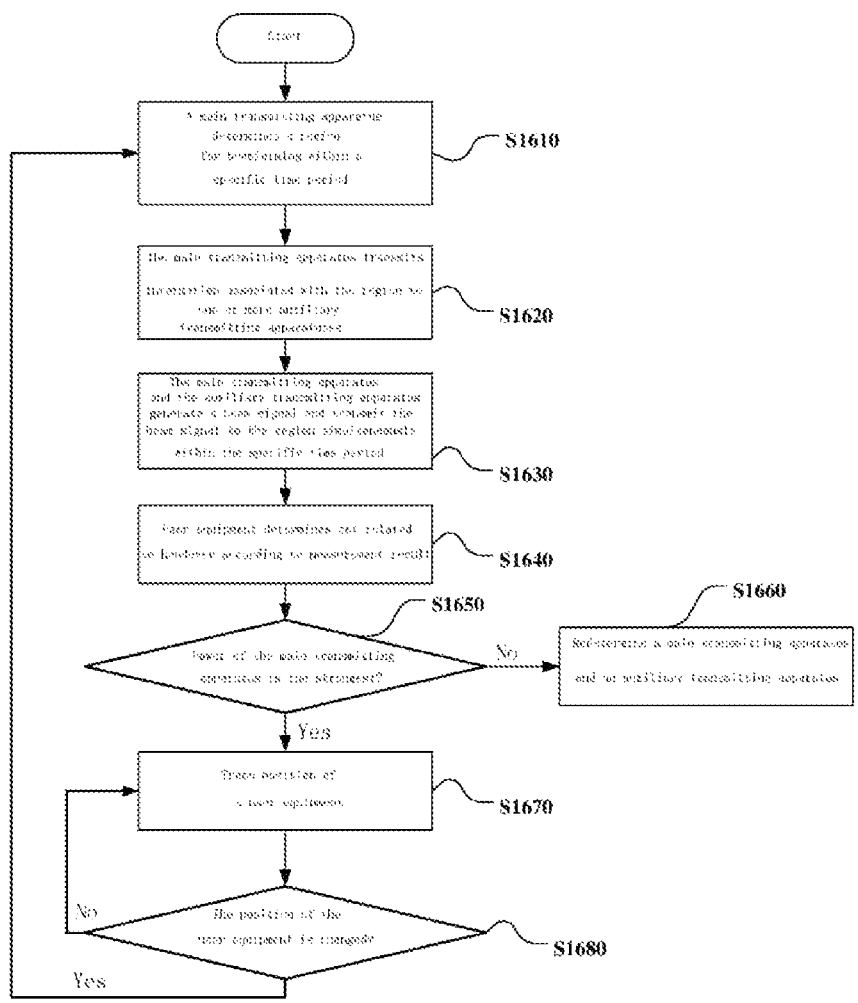
FIG. 17 is a flowchart illustrating a method for performing handover of a user equipment according to an embodiment of the present disclosure.

FIG. 17 is a flowchart illustrating a method for performing handover of a user equipment according to an embodiment of the present disclosure;

As illustrated in FIG. 17, in step S1610, a main transmitting apparatus in a wireless communication system determines a region for beamforming within a specific time period. Here, since geographic position of the a equipment is known, the main transmitting apparatus may determine the region according to positional information of the user equipment, that is, the user equipment is located in the region for beamforming. Next, in step S1620, the main transmitting apparatus transmits information associated with the region to one or more auxiliary transmitting apparatuses. Here, any one of the methods as described above may be used to determine the main transmitting apparatus and one or more auxiliary transmitting apparatuses in the wireless communication system, and the information associated with the region may also be any kind of information as described above. Next, in step S1630, the main transmitting apparatus and the auxiliary transmitting apparatus simultaneously transmit a beam signal to the region within a specific time period. According to an embodiment of the present disclosure, since the user equipment is located in the region, the user equipment may receive beam signals from the main transmitting apparatus and the auxiliary transmitting apparatus. Next, in step S1640, the user equipment may determine sets related to handover, including but not limited to an active set, a candidate set, and a neighbor set, by measuring the received beam signal. Next, in step S1650, the user equipment may determine whether signal power of the main transmitting apparatus is the strongest in the active set. If it is determined in step S1650 that the signal power of the main transmitting apparatus is not the strongest in active set, in step S1660, the transmitting apparatus with the strongest power in the active set may be redetermined as a new main transmitting apparatus, and the other transmitting apparatuses in active set and the transmitting apparatuses in the candidate set and the neighbor set are determined as new auxiliary transmitting apparatuses. If it is determined in step S1650 that the signal power of the main transmitting apparatus is still the strongest in the active set, the main transmitting apparatus is not changed in step S1670, and the main transmitting apparatus tracks position of the user equipment. Next, in step S1680, the main transmitting apparatus may determine whether the position of the user equipment is changed. If it is determined in step S1680 that the position of the user equipment is changed, the main transmitting apparatus may redetermine a region for beamforming based on position of the user equipment after change and starting from step S1610, the method according to the present disclosure is performed again. If it is determined in step S1680 that the position of the user equipment is not changed, the processing returns to step S1670 to track the position of the user equipment continuously until the position of the user equipment is changed.

As illustrated in FIG. 17, the main transmitting apparatus may determine the region for beamforming based on the position of the user equipment, and the main transmitting apparatus and the auxiliary transmitting apparatus may simultaneously transmit beam signals to the user equipment via the beam, such that the user equipment may determine sets related to the handover based on these signals to assist in the implementation of handover. In this way, the determined sets related to handover are more accurate, such that the handover of the user equipment is more accurate and effective.

<5.4 Flowchart of a Method for Performing CoMP Transmission>

Figure 18:
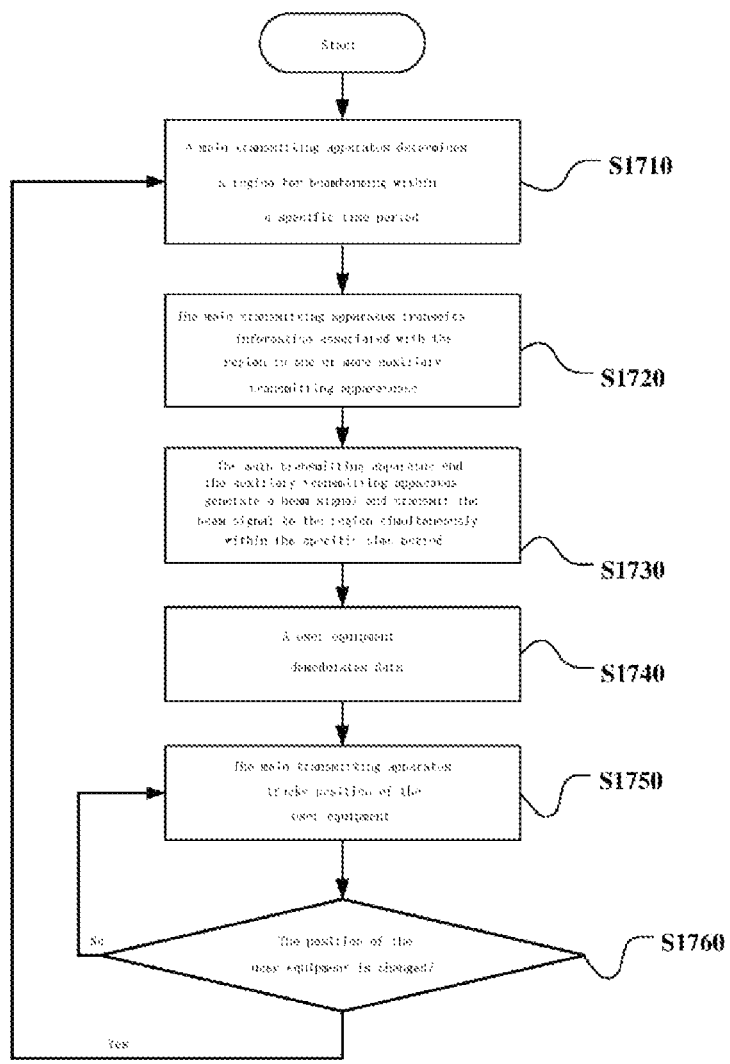
FIG. 18 is a flowchart illustrating a method for performing Coordinated Multiple Points (CoMP) transmission according to an embodiment of the present disclosure.

FIG. 18 is a flowchart illustrating a method for performing Coordinated Multiple Points (CoMP) transmission according to an embodiment of the present disclosure.

As illustrated in FIG. 18, in step S1710, a main transmitting apparatus in a wireless communication system determines a region for beamforming within a specific time period. Here, since geographic position of a user equipment is known, the main transmitting apparatus may determine the region based on positional information of the user equipment, that is, the user equipment is located in the region. Next, in step S1720, the main transmitting apparatus transmits information associated with the region to one or more auxiliary transmitting apparatuses. Here, any one of the methods as described above may be used to determine the main transmitting apparatus and one or more auxiliary transmitting apparatuses in the wireless communication system, and the information associated with the region may also be any kind of information as described above. Next, in step S1730, the main transmitting apparatus and the auxiliary transmitting apparatus simultaneously transmit beam signals to the region within the specific time. According to an embodiment of the present disclosure, since the user equipment is located in the region, the user equipment may receive beam signals from the main transmitting apparatus and the auxiliary transmitting apparatus. Next, in step S1740, the user equipment demodulates beam signals from the main transmitting apparatus and the auxiliary transmitting apparatus, thereby performing CoMP transmission. Next, in step S1750, the main transmitting apparatus may track position of the user equipment. Next, in step S1760, the main transmitting apparatus may determine whether the position of the user equipment is changed. If it is determined in step S1760 that the position of the user equipment is changed, the main transmitting apparatus may redetermine a region for beamforming based on the position of the user equipment after change and starting from step S1710, the method according to the present disclosure is performed again. If it is determined in step S1760 that the position of the user equipment is not changed, the processing returns to step S1750 to track the position of the user equipment continuously until the position of the user equipment is changed.

As illustrated in FIG. 18, the main transmitting apparatus may determine the region for beamforming based on the position of the user equipment, and the main transmitting apparatus and the auxiliary transmitting apparatus may simultaneously transmit beam signals to the user equipment via the beam, thereby performing CoMP transmission via the beam. In this way, the information received by the user equipment is transmitted by the main transmitting apparatus and the auxiliary transmitting apparatus simultaneously, avoiding information loss due to the change of the position of the user equipment.

The flowchart of the method for applying the solutions according to an embodiment of the present disclosure to applications such as locating, handover, and CoMP transmission is described in detail above, but the present disclosure is not limited thereto. The present disclosure may be applied to all scenarios in which information is transmitted simultaneously via a beam.

<5.5 Flowchart of a Method Executed by an Auxiliary Transmitting Apparatus>

Figure 19:
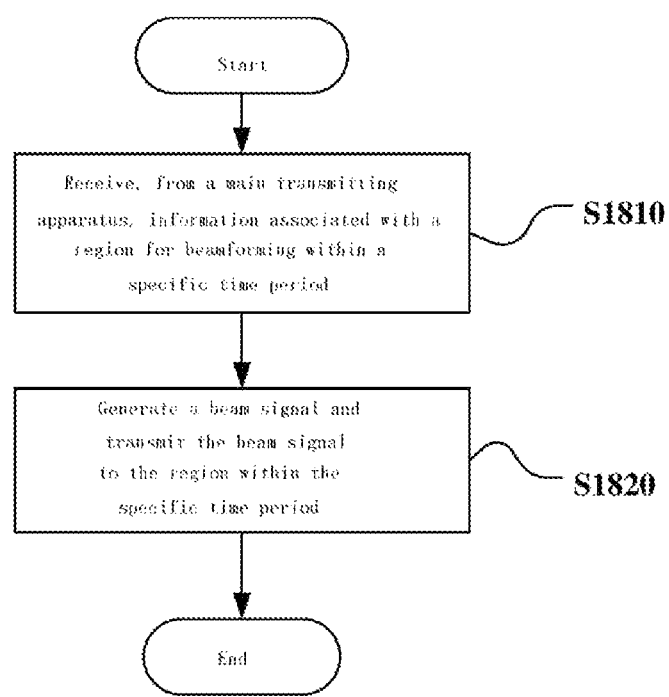
FIG. 19 is a flowchart illustrating a wireless communication method executed by an electronic equipment served as an auxiliary transmitting apparatus in a wireless communication system according to an embodiment of the present disclosure.

FIG. 19 is a flowchart illustrating a wireless communication method executed by an electronic equipment served as an auxiliary transmitting apparatus in a wireless communication system according to an embodiment of the present disclosure.

As illustrated in FIG. 19, in step S1810, information associated with a region for beamforming within a specific time period is received from a main transmitting apparatus in the wireless communication system.

Next, in step S1820, a beam signal is generated and the beam signal is transmitted to the region within the specific time period.

Here, the main transmitting apparatus and the electronic equipment generate a beam signal and transmit the beam signal to the region simultaneously within the specific time period.

Preferably, the information associated with the region includes positional information of the region.

Preferably, the method further includes: determining power information of the beam for the electronic equipment according to positional information of the electronic equipment and positional information of the region.

Preferably, the method further includes: determining direction information of the beam for the electronic equipment according to the positional information of the electronic equipment, other auxiliary transmitting apparatuses in the wireless communication system, the main transmitting apparatus and the region as well as direction information of an antenna array of the electronic equipment.

Preferably, the information associated with the region includes direction information and power information of the beam for the electronic equipment.

Preferably, the method further includes: transmitting direction information of the antenna array of the electronic equipment to the main transmitting apparatus.

Preferably, the specific time period is next beamforming period.

Preferably, the method further includes: receiving, from the main transmitting apparatus, indication information for indicating the electronic equipment to be served as an auxiliary apparatus and including identification information of the main transmitting apparatus and other auxiliary transmitting apparatuses.

Preferably, the method further includes: receiving, from a base station equipment in the wireless communication system, indication information for indicating the electronic equipment to be served as an auxiliary transmitting apparatus and including identification information of the main transmitting apparatus and other auxiliary transmitting apparatuses.

Preferably, the method further includes: estimating link quality between the electronic equipment and a user equipment; and transmitting link quality information to the base station equipment for determining, by the base station equipment, the main transmitting apparatus and one or more auxiliary transmitting apparatuses according to the link quality information.

According to an embodiment of the present disclosure, a body which executes the above method may be the electronic equipment 1300 according to an embodiment of the present disclosure. Therefore, all embodiments regarding the electronic equipment 1300 as described above are applicable thereto.

6. Application Example

The technology of the present disclosure is applicable to various products. For example, a main transmitting apparatus and an auxiliary transmitting apparatus may be implemented as any type of TRP. The TRP may have function of transmitting and receiving. For example, the TRP may receive information from a user equipment and a base station equipment, and may also transmit information to the user equipment and the base station equipment. In a typical example, the TRP may provide services for the user equipment and is controlled by the base station equipment. Further, the TRP may have a structure similar to that of the base station equipment as described below, or may also only have a structure related to transmitting and receiving information in the base station equipment.

The base station equipment may be implemented as any type of eNB, such as a macro eNB and a small eNB, and may also be implemented as any type of gNB (which is a base station in a 5G system). The small eNB such as a pico eNB, a micro eNB and a home (femto-cell) eNB may have a smaller coverage range than a macro cell. Alternatively, the base station may be implemented as any other types of base stations, such as a NodeB and a base transceiver station (BTS). The base station may include a body (also referred to as a base station equipment) configured to control wireless communications; and one or more remote radio heads (RRHs) arranged in a different position from the body.

The user equipment may be implemented as a mobile terminal (such as a smartphone, a tablet personal computer (PC), a notebook PC, a portable game terminal, a portable/softdog mobile router, and a digital camera device), or an in-vehicle terminal (such as a vehicle navigation apparatus). The user equipment may also be implemented as a terminal executing Machine-to-Machine (M2M) communication terminal (which is also referred to as a Machine-Type Communication (MTC) terminal). Furthermore, the user equipment may be a wireless communication module (such as an integrated circuit module including a single wafer) installed on each of the user equipments described above.

Application Example Regarding Base Station

First Application Example

Figure 20:
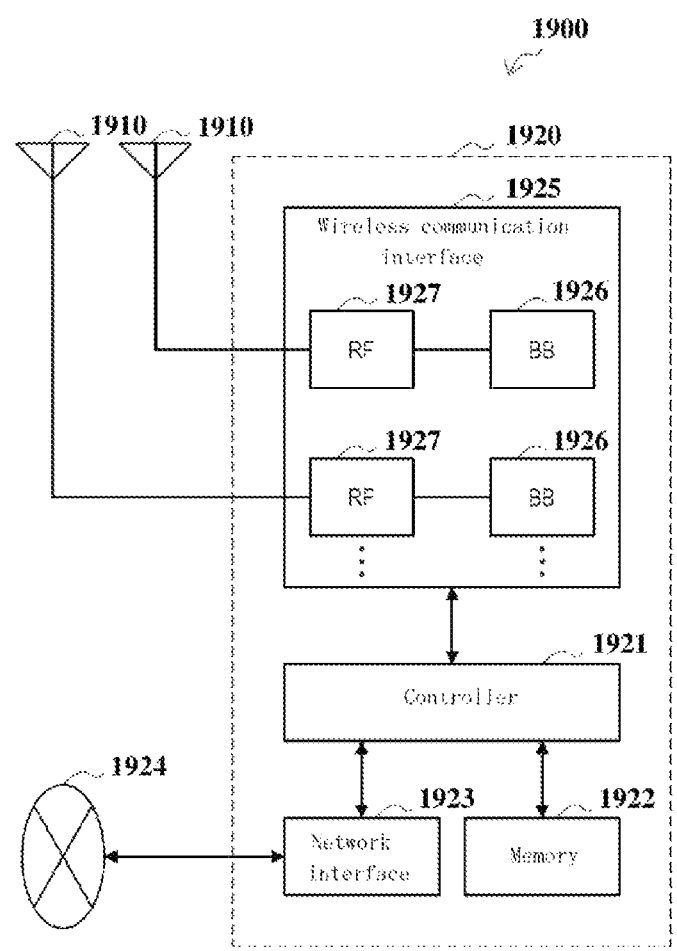
FIG. 20 is a block diagram illustrating a first example of schematic configuration of an evolved Node B (eNB)

FIG. 20 is a block diagram illustrating a first example of schematic configuration of an eNB to which the technology of the present disclosure may be applied. An eNB 1900 includes one or more antennas 1910 and a base station equipment 1920. The base station equipment 1920 and each antenna 1910 may be connected to each other via an RF cable.

Each of the antennas 1910 includes a single antenna element or multiple antenna elements (such as multiple antenna elements included in a Multiple Input Multiple Output (MIMO) antenna), and is used for the base station equipment 1920 to transmit and receive a radio signal. The eNB 1900 may include multiple antennas 1910, as illustrated in FIG. 20. For example, multiple antennas 1910 may be compatible with multiple frequency bands used by the eNB 1900. Although FIG. 20 illustrates an example in which the eNB 1900 includes multiple antennas 1910, the eNB 1900 may also include a single antenna 1910.

The base station equipment 1920 includes a controller 1921, a memory 1922, a network interface 1923 and a wireless communication interface 1925.

The controller 1921 may be, for example, a CPU or a DSP, and operates various functions of a higher layer of the base station equipment 1920. For example, the controller 1921 generates a data packet based on the data in signals processed by the wireless communication interface 1925, and transfers the generated packet via the network interface 1923. The controller 1921 may bundle data from multiple baseband processors to generate the bundled packet, and transfer the generated bundled packet. The controller 1921 may have logical functions of executing control such as radio resource control, radio bearer control, mobility management, admission control, and scheduling. The control may be executed in corporation with an adjacent eNB or a core network node. The memory 1922 includes an RAM and an ROM, and stores a program that is executed by the controller 1921, and various types of control data (such as a terminal list, transmission power data, and scheduling data).

The network interface 1923 is a communication interface for connecting the base station equipment 1920 to a core network 1924. The controller 1921 may communicate with a core network node or another eNB via the network interface 1923. In this case, the eNB 1900, and the core network node or the other eNB may be connected to each other via a logical interface (such as an Si interface and an X2 interface). The network interface 1923 may also be a wired communication interface or a wireless communication interface for radio backhaul. If the network interface 1923 is a wireless communication interface, the network interface 1923 may use a higher frequency band for wireless communication than a frequency band used by the wireless communication interface 1925.

The wireless communication interface 1925 supports any cellular communication solution (such as Long Term Evolution (LTE) and LTE-advanced), and provides a wireless connection to a terminal located in a cell of the eNB 1900 via the antenna 1910. The wireless communication interface 1925 may generally include for example a baseband (BB) processor 1926 and an RF circuit 1927. The BB processor 1926 may execute for example coding/decoding, modulation/demodulation and multiplexing/demultiplexing, and performs various types of signal processing of layers (for example, L1, Media Access Control (MAC), Radio Link Control (RLC) and Packet Data Convergence Protocol (PDCP)). The BB processor 1926 may have a part or all of the above logical functions instead of the controller 1921. The BB processor 1926 may be a memory storing communication control programs, or a module including a processor and a related circuit which are configured to execute programs. The update program may change the function of the BB processor 1926. The module may be a card or blade inserted into a slot of the base station equipment 1920. Alternatively, the module may also be a chip that is mounted on the card or the blade. In addition, the RF circuit 1927 may include, for example, a mixer, a filter, and an amplifier, and transmits and receives a radio signal via the antenna 1910.

The wireless communication interface 1925 may include multiple BB processors 1926, as illustrated in FIG. 20. For example, multiple BB processors 1926 may be compatible with multiple frequency bands used by the eNB 1900. The wireless communication interface 1925 may include multiple RF circuits 1927, as illustrated in FIG. 20. For example, multiple RF circuits 1927 may be compatible with multiple antenna elements. Although FIG. 20 illustrates an example in which the wireless communication interface 1925 includes multiple BB processors 1926 and multiple RF circuits 1927, the wireless communication interface 1925 may also include a single BB processor 1926 or a single RF circuit 1927.

Second Application Example

Figure 21:
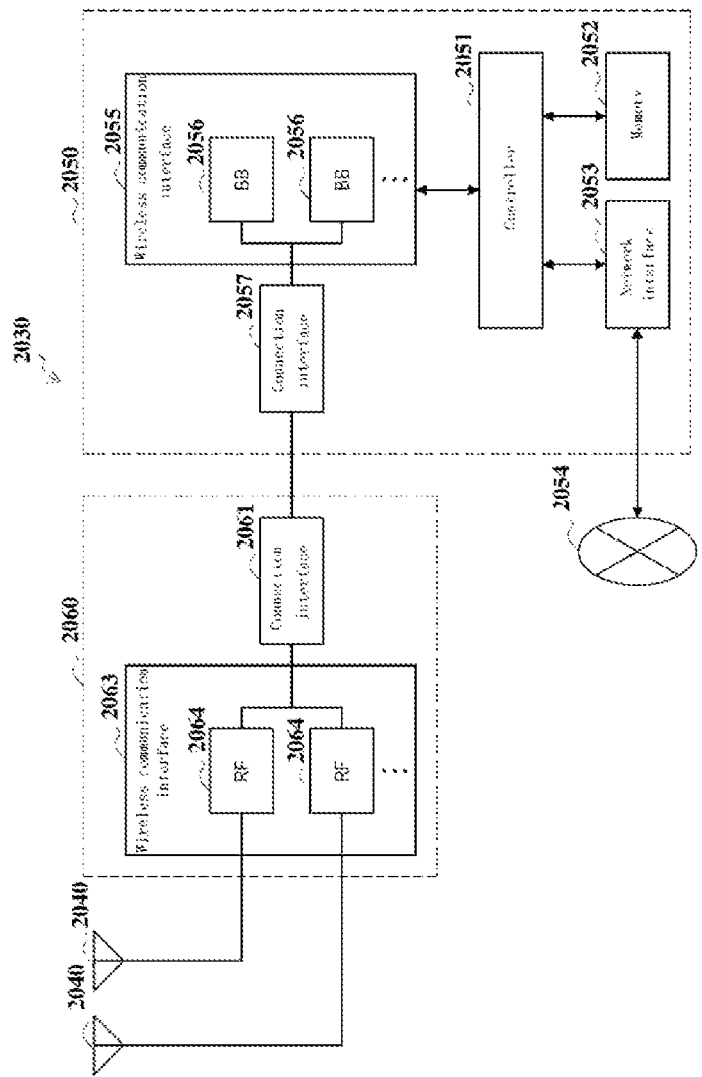
FIG. 21 is a block diagram illustrating a second example of schematic configuration of an eNB.

FIG. 21 is a block diagram illustrating a second example of schematic configuration of an eNB to which the technology of the present disclosure may be applied. An eNB 2030 includes one or more antennas 2040, a base station equipment 2050 and an RRH 2060. The RRH 2060 and each antenna 2040 may be connected to each other via an RF cable. The base station equipment 2050 and the RRH 2060 may be connected to each other via a high-speed line such as an optical fiber cable.

Each of the antennas 2040 includes a single antenna element or multiple antenna elements (such as multiple antenna elements included in a MIMO antenna), and is used to transmit and receive a radio signal by the RRH 2060. As illustrated in FIG. 21, the eNB 2030 may include multiple antennas 2040. For example, multiple antennas 2040 may be compatible with multiple frequency bands used by the eNB 2030. Although FIG. 21 illustrates an example in which the eNB 2030 includes multiple antennas 2040, the eNB 2030 may also include a single antenna 2040.

The base station equipment 2050 includes a controller 2051, a memory 2052, a network interface 2053, a wireless communication interface 2055 and a connection interface 2057. The controller 2051, the memory 2052 and the network interface 2053 are respectively the same as the controller 1921, the memory 1922 and the network interface 1923 described with reference to FIG. 20.

The wireless communication interface 2055 supports any cellular communication solution (such as LTE and LTE-Advanced), and provides wireless communication to a terminal positioned in a sector corresponding to the RRH 2060 via the RRH 2360 and the antenna 2040. The wireless communication interface 2055 may generally include, for example, a BB processor 2056. The BB processor 2056 is the same as the BB processor 1926 described with reference to FIG. 20, except the BB processor 2056 is connected to an RF circuit 2064 of the RRH 2060 via the connection interface 2057. As illustrated in FIG. 21, the wireless communication interface 2055 may include multiple BB processors 2056. For example, multiple BB processors 2056 may be compatible with multiple frequency bands used by the eNB 2030. Although FIG. 20 illustrates an example in which the wireless communication interface 2055 includes multiple BB processors 2056, the wireless communication interface 2055 may also include a single BB processor 2056.

The connection interface 2057 is an interface for connecting the base station equipment 2050 (the wireless communication interface 2055) to the RRH 2060. The connection interface 2057 may also be a communication module for communication in the above high-speed line for connecting the base station equipment 2050 (the wireless communication interface 2055) to the RRH 2060.

The RRH 2060 includes a connection interface 2061 and a wireless communication interface 2063.

The connection interface 2061 is an interface for connecting the RRH 2060 (the wireless communication interface 2063) to the base station equipment 2050. The connection interface 2061 may also be a communication module for the communication in the above high-speed line.

The wireless communication interface 2063 transmits and receives a radio signal via the antenna 2040. The wireless communication interface 2063 may generally include, for example, the RF circuit 2064. The RF circuit 2064 may include, for example, a frequency mixer, a filter and an amplifier, and transmits and receives a radio signal via the antenna 2040. The wireless communication interface 2063 may include multiple RF circuits 2064, as illustrated in FIG. 21. For example, multiple RF circuits 2064 may support multiple antenna elements. Although FIG. 21 illustrates an example in which the wireless communication interface 2063 includes multiple RF circuits 2064, the wireless communication interface 2063 may also include a single RF circuit 2064.

Application Example Regarding Terminal Device

First Application Example

Figure 22:
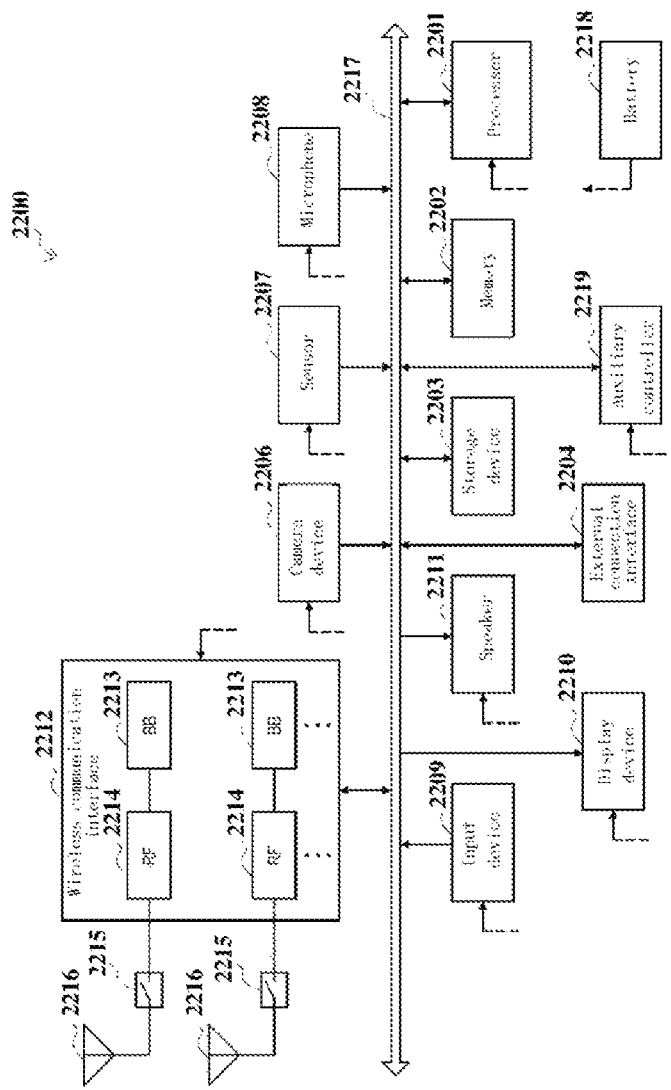
FIG. 22 is a block diagram illustrating an example of schematic configuration of a smartphone.

FIG. 22 is a block diagram illustrating an example of schematic configuration of a smartphone 2200 to which the technology of the present disclosure may be applied. The smartphone 2200 includes a processor 2201, a memory 2202, a storage device 2203, an external connection interface 2204, a camera device 2206, a sensor 2207, a microphone 2208, an input device 2209, a display device 2210, a speaker 2211, a wireless communication interface 2212, one or more antenna switches 2215, one or more antennas 2216, a bus 2217, a battery 2218, and an auxiliary controller 2219.

The processor 2201 may be for example a CPU or a System On Chip (SoC), and control functions of an application layer and an additional layers of the smartphone 2200. The memory 2202 includes an RAM and an ROM, and stores data, and programs executed by the processor 2201. The storage device 2203 may include a storage medium, such as a semiconductor memory and a hard disc. The external connection interface 2204 is an interface for connecting an external device (such as a memory card and a universal serial bus (USB) device) to the smartphone 2200.

The camera device 2206 includes an image sensor (such as a Charge Coupled Device (CCD) and a Complementary Metal Oxide Semiconductor (CMOS)) and generates a captured image. The sensor 2207 may include a set of sensors, such as a measurement sensor, a gyroscope sensor, a geomagnetic sensor and an acceleration sensor. The microphone 2208 converts sound input into the smartphone 2200 into an audio signal. The input device 2209 includes for example a touch sensor configured to detect touch on a screen of the display device 2210, a keypad, a keyboard, a button or a switch, and receives an operation or information input from a user. The display device 2210 includes a screen (such as a Liquid Crystal Display (LCD) and an Organic Light Emitting Diode (OLED) display), and displays an output image of the smartphone 2200. The speaker 2211 converts the audio signal output from the smartphone 2200 into sound.

The wireless communication interface 2212 supports any cellular communication solution (such as LET and LTE-Advanced), and performs wireless communication. The wireless communication interface 2212 may generally include, for example, a BB processor 2213 and an RF circuit 2214. The BB processor 2213 may perform, for example, encoding/decoding, modulating/demodulating, and multiplexing/demultiplexing, and performs various types of signal processing for wireless communication. In addition, the RF circuit 2214 may include a mixer, a filter and an amplifier, and transmits and receives a radio signal via the antenna 2216. The wireless communication interface 2212 may be a chip module on which the BB processor 2213 and the RF circuit 2214 are integrated. The wireless communication interface 2212 may include multiple BB processors 2213 and multiple RF circuits 2214, as illustrated in FIG. 22. Although FIG. 22 illustrates an example in which the wireless communication interface 2212 includes multiple BB processors 2213 and multiple RF circuits 2214, the wireless communication interface 2212 may also include a single BB processor 2213 or a single RF circuit 2214.

Furthermore, in addition to a cellular communication solution, the wireless communication interface 2212 may support another type of wireless communication solution such as a short-distance wireless communication solution, a near field communication solution, and a wireless Local Region Network (LAN) solution. In this case, the wireless communication interface 2212 may include the BB processor 2213 and the RF circuit 2214 for each wireless communication solution.

Each of the antenna switches 2215 switches connection destinations of the antennas 2216 among multiple circuits (for example, circuits for different wireless communication solutions) included in the wireless communication interface 2212.

Each of the antennas 2216 includes a single antenna element or multiple antenna elements (such as multiple antenna elements included in a MIMO antenna), and is used for the wireless communication interface 2212 to transmit and receive a radio signal. The smartphone 2200 may include multiple antennas 2216, as illustrated in FIG. 22. Although FIG. 22 illustrates an example in which the smartphone 2200 includes multiple antennas 2216, the smartphone 2200 may also include a single antenna 2216.

Furthermore, the smartphone 2200 may include the antenna 2216 for each wireless communication solution. In this case, the antenna switch 2215 may be omitted from the configuration of the smartphone 2200.

The bus 2217 connects the processor 2201, the memory 2202, the storage device 2203, the external connection interface 2204, the camera device 2206, the sensor 2207, the microphone 2208, the input device 2209, the display device 2210, the speaker 2211, the wireless communication interface 2212, and the auxiliary controller 2219 to each other. The battery 2218 supplies power to each block of the smartphone 2200 illustrated in FIG. 22 via feeder lines which are partially illustrated with dashed lines in FIG. 22. The auxiliary controller 2219, for example, operates a minimum necessary function of the smartphone 2200, for example, in a sleep mode.

In the smartphone 2200 illustrated in FIG. 22, the generating unit 1420, the demodulating unit 1430 and the handover unit 1440 described with reference to FIG. 14 may be implemented by the processor 2201 or the auxiliary controller 2219. At least a part of the functions may be implemented by the processor 2201 and the auxiliary controller 2219. For example, the processor 2201 or the auxiliary controller 2219 execute the function of generating feedback information, demodulating data and determining sets related to the handover by executing instructions stored in the memory 2202 or the storage device 2203.

Second Application Example

Figure 23:
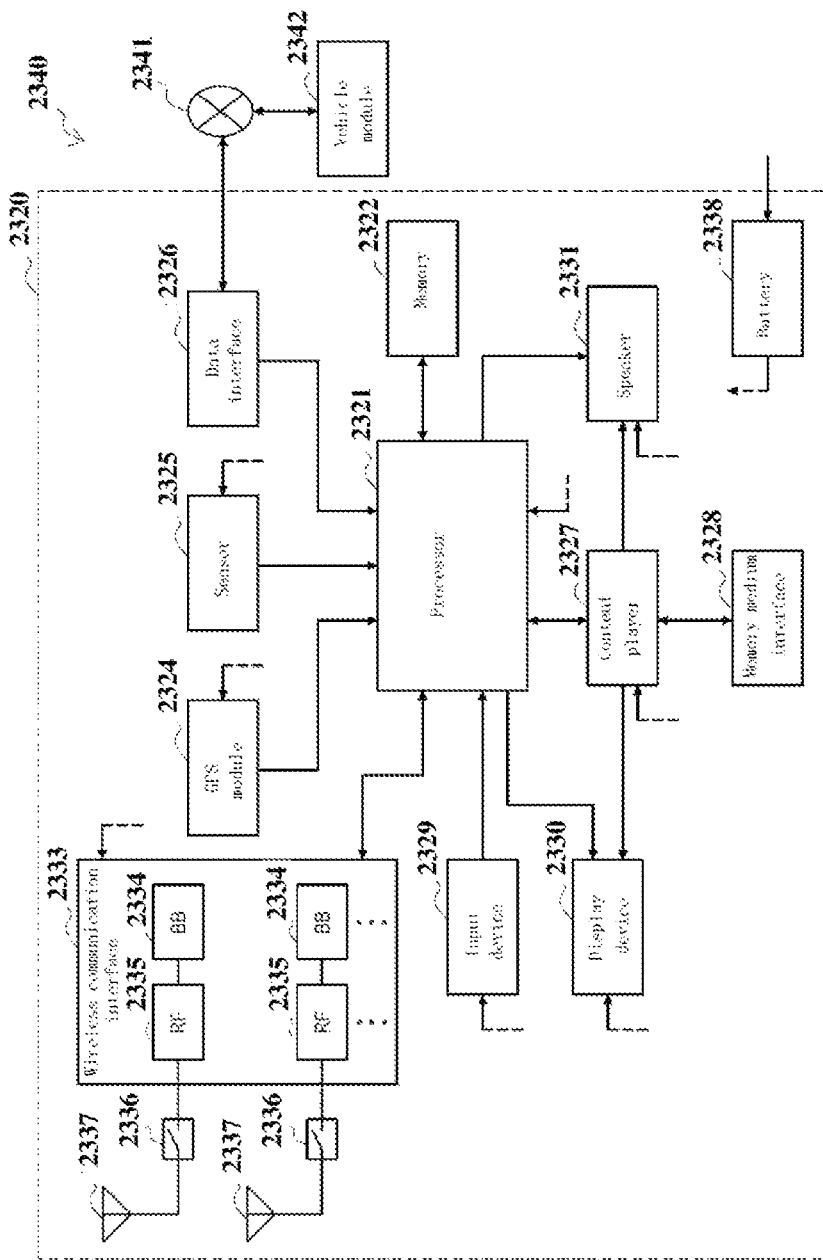
FIG. 23 is a block diagram illustrating an example of schematic configuration of a vehicle navigation apparatus.

FIG. 23 is a block diagram illustrating an example of schematic configuration of a vehicle navigation apparatus 2320 to which the technology of the present disclosure may be applied. The vehicle navigation apparatus 2320 includes a processor 2321, a memory 2322, a Global Positioning System (GPS) module 2324, a sensor 2325, a data interface 2326, a content player 2327, a storage medium interface 2328, an input device 2329, a display device 2330, a speaker 2331, a wireless communication interface 2333, one or more antenna switches 2336, one or more antennas 2337 and a battery 2338.

The processor 2321 may be for example a CPU or SoC, and controls the navigation function and additional functions of the vehicle navigation apparatus 2320. The memory 2322 includes an RAM and an ROM, and stores data, and programs executed by the processor 2321.

The GPS module 2324 measures position of the vehicle navigation apparatus 2320 (such as a latitude, a longitude and a height) using a GPS signal received from a GPS satellite. The sensor 2325 may include a set of sensors such as a gyroscope sensor, a geomagnetic sensor and an air pressure sensor. The data interface 2326 is connected to, for example, an in-vehicle network 2341 via a terminal that is not illustrated, and acquires data (such as vehicle speed data) generated by the vehicle.

The content player 2327 reproduces contents stored in a storage medium (such as CD and DVD) which is inserted into the storage medium interface 2328. The input device 2329 includes, for example, a touch sensor configured to detect touch on a screen of the display device 2330, a button, or a switch, and receives an operation or an information input from a user equipment. The display device 2330 includes a screen such as a LCD or an OLED display, and displays an image of the navigation function or content that is reproduced. The speaker 2331 outputs a sound for a navigation function or the reproduced content.

The wireless communication interface 2333 supports any cellular communication solution (such as LTE and LTE-advanced) and performs wireless communication. The wireless communication interface 2333 may generally include, for example, a BB processor 2334 and an RF circuit 2335. The BB processor 2334 may perform for example coding/decoding, modulation/demodulation and multiplexing/demultiplexing, and performs various types of signal processing for wireless communication. In addition, the RF circuit 2335 may include, for example, a mixer, a filter and an amplifier, and transmits and receives a radio signal via the antenna 2337. The wireless communication interface 2333 may be a chip module on which the BB processor 2334 and the RF circuit 2335 are integrated. The wireless communication interface 2333 may include multiple BB processors 2334 and multiple RF circuits 2335, as illustrated in FIG. 23. Although FIG. 23 illustrates an example in which the wireless communication interface 2333 includes multiple BB processors 2334 and multiple RF circuits 2335, the wireless communication interface 2333 may also include a single BB processor 2334 or a single RF circuit 2335.

Further, in addition to the cellular communication solution, the wireless communication interface 2333 may support another type of wireless communication solution, such as a short-distance wireless communication solution, a near field communication solution and a wireless LAN solution. In this case, for each of the wireless communication solutions, the wireless communication interface 2333 may include a BB processor 2334 and an RF circuit 2335.

Each of the antenna switches 2336 switches connection destinations of the antennas 2337 among multiple circuits (such as circuits for different wireless communication solutions) included in the wireless communication interface 2333.

Each of the antennas 2337 includes a single antenna element or multiple antenna elements (such as multiple antenna elements included in a MIMO antenna) and is used for the wireless communication interface 2333 to transmit and receive a radio signal. As illustrated in FIG. 23, the vehicle navigation apparatus 2320 may include multiple antennas 2337. Although FIG. 23 illustrates an example in which the vehicle navigation apparatus 2320 includes multiple antennas 2337, the vehicle navigation apparatus 2320 may also include a single antenna 2337.

Furthermore, the vehicle navigation apparatus 2320 may include the antenna 2537 for each wireless communication solution. In this case, the antenna switch 2336 may be omitted from the configuration of the vehicle navigation apparatus 2320.

The battery 2338 supplies power to each block of the vehicle navigation apparatus 2320 illustrated in FIG. 23 via feeder lines which are partially illustrated with dashed lines in FIG. 23. The battery 2338 accumulates power supplied from the vehicle.

In the vehicle navigation apparatus 2320 illustrated in FIG. 23, the generating unit 1420, the demodulating unit 1430 and the handover unit 1440 described with reference to FIG. 14 may be implemented by the processor 2321. At least a part of the functions may be implemented by the processor 2321. For example, the processor 2321 execute the function of generating feedback information, demodulating data and determining sets related to the handover by executing instructions stored in the memory 2322.

The technology of the present disclosure may also be implemented as an in-vehicle system (or a vehicle) 2340 including one or more of the vehicle navigation apparatus 2320, an in-vehicle network 2341 and a vehicle module 2342. The vehicle module 2342 generates vehicle data (such as vehicle speed, engine speed, and fault information), and outputs the generated data to the in-vehicle network 2341.

Preferred embodiments of the present disclosure have been described above with reference to the drawings, but the disclosure is not limited to the above examples of course. Those skilled in the art may obtain various changes and modifications within the scope of the appended claims, and it should be understood that such changes and modifications naturally fall within the technical scope of the present disclosure.

For example, in the drawings, units illustrated by dashed boxes in the functional block diagram are optional functional units in a corresponding device, and the optional functional units may be combined in a suitable manner to implement a required function.

For example, multiple functions of one unit in the above embodiment may be implemented by separate device. Alternatively, multiple functions implemented by multiple units in the above embodiments may be implemented by separated device respectively. Furthermore, one of the above functions may be implemented by multiple units. Needless to say, such configuration is included in the technical scope of the present disclosure.

In the specification, steps described in the flowchart include not only the processing performed chronologically, but also the processing performed in parallel or individually rather than chronologically. Furthermore, even in the steps processed chronologically, without saying, the order may be appropriately changed.

The embodiments of the present disclosure are described in detail above with reference to the drawings. However, it should be understood that the above embodiments are only illustrative rather than limiting of the present disclosure. Those skilled in the art can make various modifications and changes to the above embodiments without departing from the spirit and scope of the present disclosure. Therefore, the scope of the present disclosure is defined only by the appended claims and their equivalents.

The invention claimed is:

1. An electronic equipment used as a main transmitting apparatus in a wireless communication system, comprising a processing circuit configured to:
   determine a region for beamforming within a specific time period;
   transmit information associated with the region to one or more auxiliary transmitting apparatuses in the wireless communication system for generating a beam signal by the one or more auxiliary transmitting apparatuses and transmitting the beam signal to the region by the one or more auxiliary transmitting apparatuses within the specific time period; and
   generate a beam signal and transmit the beam signal to the region simultaneously with the beam signal of the one or more auxiliary transmitting apparatuses within the specific time period.

2. The electronic equipment according to claim 1, wherein the information associated with the region comprises positional information of the region, the positional information being used for determining direction information and power information of the beam by the one or more auxiliary transmitting apparatuses, and
   wherein the information associated with the region comprises direction information and power information of the beam for each of the one or more auxiliary transmitting apparatuses.

3. The electronic equipment according to claim 2, wherein the processing circuit is further configured to:
   determine the power information of the bean for each auxilia ing apparatus according to the positional information of each auxiliary transmitting apparatus and the positional information of the region.
4. The electronic equipment according to claim 2, wherein the processing circuit is further configured to:
   determine direction information of the beam for each auxiliary transmitting apparatus according to positional information of the electronic equipment and the one or more auxiliary transmitting apparatuses, and the position information of the region as well as direction information of an antenna array of the one or more auxiliary transmitting apparatuses.
5. The electronic equipment according to claim 1, wherein the processing circuit is further configured to:
   determine direction information and power information of the beam for the electronic equipment; and
   generate a beam signal within the specific time period according o the direction information and power information.
6. The electronic equipment according to claim 1, wherein the processing circuit is further configured to:
   receive, from a user equipment, feedback information for the beam signal transmitted by the electronic equipment and the one or more auxiliary transmitting apparatuses; and
   locate the user equipment according to the feedback information.
7. The electronic equipment according to claim 6, wherein the processing circuit is further configured to:
   set a timer, in case of not receiving from the user equipment the feedback information for the beam signal transmitted by the electronic equipment and the one or more auxiliary transmitting apparatuses when the timer expires, executing operations of:
   redetermining a region for beamforming within a specific time period;
   transmitting information associated with the redetermined region to the one or more auxiliary transmitting apparatuses; and
   generating a beam signal and transmitting the beam signal to the redetermined region within the specific time period.
8. The electronic equipment according to claim 1, wherein the processing circuit is configured to:
   receive, from a base station equipment in the wireless communication system, indication information for indicating the electronic equipment to be served as a main transmitting apparatus and comprising identification information of the one or more auxiliary transmitting apparatuses;
   estimate link quality between the electronic equipment and a user equipment; and
   transmit link quality information to the base station equipment for determining, by the base station equipment, the main transmitting apparatus and the one or more auxiliary transmitting apparatuses according to the link quality information.
9. The electronic equipment according to claim 1, wherein the processing circuit is further configured to:
   transmit identification information of the electronic equipment and the one or more auxiliary transmitting apparatuses to a user equipment for detecting, by the user equipment, beam signals from the electronic equipment and the one or more auxiliary transmitting apparatuses.
10. The electronic equipment according to claim 1, wherein the processing circuit is further configured to:
    determine the region for beamforming within the specific time period according to positional information of a user equipment.
11. The electronic equipment according to claim 10, wherein the processing circuit is further configured to:
    perform, when it is determined that the user equipment moves, operations of:
    redetermining a region for beamforming within a specific time period according to positional information of the user equipment after movement;
    transmitting information associated with the redetermined region to the one or more auxiliary apparatuses for generating a beam signal and transmitting the beam signal to the redetermined region by the one or more auxiliary transmitting apparatuses within the specific time period; and
    generating a beam signal and transmitting the beam signal to the redetermined region within the specific time period.
12. An electronic equipment used as an auxiliary transmitting apparatus in a wireless communication system, comprising a processing circuit configured to:
    receive, from a main transmitting apparatus in the wireless communication system, information associated with a region for beamforming within a specific time period; and
    generate a beam signal and transmit the beam signal to the region within the specific time period,
    wherein the main transmitting apparatus and the auxiliary transmitting apparatus generate beam signals and transmit the beam signals to the region simultaneously within the specific time period.
13. The electronic equipment according to claim 12, wherein the information associated with the region comprises positional information of the region.
14. The electronic equipment according to claim 13, wherein the processing circuit is further configured to:
    determine power information of the beam signal for the electronic equipment according to positional information of the electronic equipment and the positional information of the region.
15. The electronic equipment according to claim 13, wherein the processing circuit is further configured to:
    determine direction information of the beam signal for the electronic equipment according to positional information of the electronic equipment, other auxiliary transmitting apparatuses in the wireless communication system, the main transmitting apparatus and the position information of the region as well as direction information of an antenna array of the electronic equipment.
16. The electronic equipment according to claim 12, wherein the information associated with the region comprises direction information and power information of the beam for the electronic equipment.
17. The electronic equipment according to claim 12, wherein the processing circuit is further configured to:
    receive, from the main transmitting apparatus, indication information for indicating the electronic equipment to be served as an auxiliary apparatus and comprising identification information of the main transmitting apparatus and other auxiliary transmitting apparatuses.

18. The electronic equipment according to claim 12, wherein the processing circuit is further configured to:
receive, from a base station equipment in the wireless communication system, indication information for indicating the electronic equipment to be served as an auxiliary transmitting apparatus and comprising identification information of the main transmitting apparatus and other auxiliary transmitting apparatuses.

19. The electronic equipment according to claim 18, wherein the processing circuit is further configured to:
estimate link quality between the electronic equipment and a user equipment; and
transmit link quality information to the base station equipment for determining, by the base station equipment, the main transmitting apparatus and one or more auxiliary transmitting apparatuses according to the link quality information.

20. A wireless communication method performed by an electronic equipment served as a main transmitting apparatus in a wireless communication system, comprising:
determining a region for beamforming within a specific time period;
transmitting information associated with the region to one or more auxiliary transmitting apparatuses in the wireless communication system for generating a beam signal by the one or more auxiliary transmitting apparatuses and transmitting the beam signal to the region by the one or more auxiliary transmitting apparatuses within the specific time period; and
generating a beam signal and transmitting the beam signal to the region simultaneously with the beam signal of the one or more auxiliary transmitting apparatuses within the specific time period.

* * * * *